US 11,702,535 B2

(12) United States Patent
Ruocco et al.

(10) Patent No.: US 11,702,535 B2
(45) Date of Patent: Jul. 18, 2023

(54) FLUORINE-FREE POLYMER PROCESSING AID BLENDS

(71) Applicant: ExxonMobil Chemical Patents Inc., Baytown, TX (US)

(72) Inventors: Nino Ruocco, Houston, TX (US); Michael A. Leaf, Baytown, TX (US); Danny Van Hoyweghen, Heverlee (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/934,999

(22) Filed: Sep. 23, 2022

(65) Prior Publication Data
US 2023/0031000 A1 Feb. 2, 2023

Related U.S. Application Data

(60) Provisional application No. 63/261,908, filed on Sep. 30, 2021, provisional application No. 63/266,782, (Continued)

(51) Int. Cl.
*C08L 23/06* (2006.01)
*C08K 5/098* (2006.01)
(Continued)

(52) U.S. Cl.
CPC ............ *C08L 23/0815* (2013.01); *C08J 5/18* (2013.01); *C08K 5/06* (2013.01); *C08K 5/098* (2013.01);
(Continued)

(58) Field of Classification Search
CPC ......... C08L 23/00–23/24; C08K 5/098; C08K 5/06; C08K 5/1535
See application file for complete search history.

(56) References Cited

U.S. PATENT DOCUMENTS 3,222,314 A  12/1965  Wolinski
4,013,622 A   3/1977  DeJuneas et al.
(Continued)

FOREIGN PATENT DOCUMENTS

CA  2264463 A1  9/2000
CN  103819782 A  *  5/2014  ............... C08K 3/26
(Continued)

OTHER PUBLICATIONS

CN 105542303 A (May 4, 2016); machine translation. (Year: 2016).*

(Continued)

*Primary Examiner* — Rip A Lee
(74) *Attorney, Agent, or Firm* — ExxonMobil Technology and Engineering Company-Chemicals

(57) ABSTRACT

Provided herein are polymer compositions comprising a polymer and polymer processing aid (PPA) comprising a blend of at least two of: (i) a polyethylene glycol; (ii) a surfactant comprising a sorbitan ester or a polysorbate; and (iii) a metal salt of a fatty acid. The polymer can be a $C_2$-$C_6$ olefin homopolymer or a copolymer of two or more $C_2$-$C_{20}$ α-olefins, and the polymer composition can take the form of polymer pellets; a polymer melt; reactor-grade polymer granules and/or polymer slurries; or other form of polymer composition containing the PPA and optionally one or more other additives. The polymer composition is preferably free or substantially free of fluorine, including fluoropolymer-based PPAs.

17 Claims, 8 Drawing Sheets

Related U.S. Application Data filed on Jan. 14, 2022, provisional application No. 63/267,640, filed on Feb. 7, 2022, provisional application No. 63/309,859, filed on Feb. 14, 2022, provisional application No. 63/309,871, filed on Feb. 14, 2022, provisional application No. 63/366,678, filed on Jun. 20, 2022, provisional application No. 63/367,241, filed on Jun. 29, 2022, provisional application No. 63/367,425, filed on Jun. 30, 2022.

(51) Int. Cl.
    *C08K 5/06*     (2006.01)
    *C08K 5/1535*     (2006.01)
    *C08L 23/00*     (2006.01)
    *C08L 23/08*     (2006.01)
    *C08L 71/02*     (2006.01)
    *C08J 5/18*     (2006.01)

(52) U.S. Cl.
    CPC ............ *C08K 5/1535* (2013.01); *C08L 71/02* (2013.01); *C08J 2323/08* (2013.01); *C08L 23/06* (2013.01); *C08L 2203/16* (2013.01); *C08L 2205/06* (2013.01); *C08L 2207/066* (2013.01)

(56) References Cited

U.S. PATENT DOCUMENTS

| | | | | |
|---|---|---|---|---|
| 4,327,009 | A * | 4/1982 | Allen | C08K 5/04 |
| | | | | 264/211 |
| 4,540,538 | A | 9/1985 | Corwin et al. | |
| 4,855,360 | A | 8/1989 | Duchesne et al. | |
| 5,015,693 | A | 5/1991 | Duchesne et al. | |
| 6,294,604 | B1 | 9/2001 | Focquet et al. | |
| 7,041,742 | B2 * | 5/2006 | Panek | C08L 23/10 |
| | | | | 524/378 |
| 7,442,742 | B1 | 10/2008 | Smink et al. | |
| 7,528,185 | B2 | 5/2009 | Lee | |
| 8,178,479 | B2 | 5/2012 | Cernohous | |
| 8,388,868 | B2 | 3/2013 | Easter | |
| 8,455,580 | B2 | 6/2013 | Sengupta et al. | |
| 8,552,136 | B2 | 10/2013 | Papp et al. | |
| 8,728,370 | B2 | 5/2014 | Vogt et al. | |
| 9,115,274 | B2 | 8/2015 | Bates | |
| 9,187,629 | B2 | 11/2015 | Adamczyk et al. | |
| 9,896,575 | B2 | 2/2018 | Duchesne et al. | |
| 9,920,285 | B2 * | 3/2018 | Wakita | C08K 5/101 |
| 10,242,769 | B2 | 3/2019 | Kohri et al. | |
| 10,358,506 | B2 * | 7/2019 | Ding | C08F 4/65904 |
| 10,544,293 | B2 | 1/2020 | Kohri et al. | |
| 10,982,079 | B2 | 4/2021 | Lavalee et al. | |
| 2005/0070644 | A1 | 3/2005 | Tikuisis et al. | |
| 2008/0132654 | A1 | 6/2008 | Ho et al. | |
| 2013/0244522 | A1 * | 9/2013 | Knack | B29C 35/02 |
| | | | | 428/221 |
| 2014/0182882 | A1 | 7/2014 | Adamczyk | |
| 2014/0242314 | A1 | 8/2014 | Inn et al. | |
| 2015/0175785 | A1 | 6/2015 | Lavallee et al. | |
| 2016/0145427 | A1 | 5/2016 | Eng et al. | |
| 2017/0342245 | A1 | 11/2017 | Lavallee et al. | |
| 2020/0325314 | A1 | 10/2020 | Bergqvist et al. | |
| 2022/0112363 | A1 | 4/2022 | Hamad et al. | |

FOREIGN PATENT DOCUMENTS

| | | | | |
|---|---|---|---|---|
| CN | 104277300 A * | 1/2015 | ............ | C08L 23/06 |
| CN | 104403170 A * | 3/2015 | ............ | C08L 23/06 |
| CN | 103772789 B | 4/2016 | | |
| CN | 105542303 A * | 5/2016 | ............ | C08L 23/12 |
| CN | 104558751 B1 | 6/2017 | | |
| CN | 107540920 A | 1/2018 | | |
| CN | 107955244 A * | 4/2018 | ............ | C08L 23/06 |
| CN | 109535541 A | 3/2019 | | |
| CN | 110317383 | 10/2019 | | |
| CN | 108481855 B | 7/2020 | | |
| CN | 112029173 A | 12/2020 | | |
| EP | 0 524 404 A1 * | 1/1993 | ............ | G03C 3/00 |
| EP | 1 839 851 A2 * | 3/2007 | ............ | B32B 27/32 |
| JP | 2012009754 | 1/2012 | | |
| KR | 10-2020-0053903 | 5/2020 | | |
| KR | 10-2167728 | 10/2020 | | |
| WO | 2011-028206 | 3/2011 | | |
| WO | WO 2012123357 A1 * | 9/2012 | ............ | C08L 23/14 |
| WO | WO 2013023247 A1 * | 2/2013 | ............ | C08L 23/00 |
| WO | 2017-077455 | 5/2017 | | |
| WO | 2021/220134 A1 | 11/2021 | | |
| WO | 2022-076296 A1 | 4/2022 | | |
| WO | 2022-079601 A1 | 4/2022 | | |

OTHER PUBLICATIONS

CN 104277300 A (Jan. 14, 2015); machine translation. (Year: 2015).*

CN 103819782 A (May 28, 2014); machine translation. (Year: 2014).*

D1 Akers, et al. (2002) "Formulation development of protein dosage forms" In: "Development and Manufacture of Protein Pharmaceuticals", Jan. 1, 2002, Kluwer Academic book, XP055311509, pp. 47-75.

* cited by examiner

Clean Die

Die buildup after 12 hr. of
Exceed XP™ 8656ML with PEG

FLUORINE-FREE POLYMER PROCESSING AID BLENDS

CROSS-REFERENCED RELATED APPLICATIONS

This application claims the benefit of U.S. Provisional Application 63/261,908 filed Sep. 30, 2021 entitled "Fluorine-Free Polymer Processing Aids", and also claims the benefit of U.S. Provisional Application 63/266,782 filed Jan. 14, 2022 entitled "Fluorine-Free Polymer Processing Aids", and also claims the benefit of U.S. Provisional Application 63/267,640 filed Feb. 7, 2022 entitled "Fluorine-Free Polymer Processing Aids Including Polyethylene Glycols", and also claims the benefit of U.S. Provisional Application 63/309,859 filed Feb. 14, 2022 entitled "Fluorine-Free Polymer Processing Aids Including Polyethylene Glycols", and also claims the benefit of U.S. Provisional Application 63/309,871 filed Feb. 14, 2022 entitled "Fluorine-Free Polymer Processing Aid Blends", and also claims the benefit of U.S. Provisional Application 63/366,678 filed Jun. 20, 2022 entitled "Fluorine-Free Polymer Processing Aid Blends", and also claims the benefit of U.S. Provisional Application 63/367,241 filed Jun. 29, 2022 entitled "Polyethylene Glycol-Based Polymer Processing Aids", and also claims the benefit of U.S. Provisional Application 63/367,425 filed Jun. 30, 2022 entitled "Polyethylene Glycol-Based Polymer Processing Aid Masterbatches", the entireties of which are incorporated by reference herein.

FIELD

The present disclosure relates to additives for polyolefin polymers (such as polyethylene), as well as the polymers themselves, methods of making them, and articles made therefrom.

BACKGROUND

Polyolefin polymer compositions are in high demand for many applications, including various films (such as cast films, shrink films, and blown films), sheets, membranes such as geomembranes, sacks, pipes (e.g., polyethylene of raised temperature (PE-RT) pipes, utility pipes, and gas distribution pipes), roto-molded parts, blow-molded flexible bottles or other containers, and various other blow molded/extruded articles such as bottles, drums, jars, and other containers. These applications have been commonly made from, for example, polyethylene polymers.

Polyolefin polymers are most commonly produced and sold as pellets, formed in post-polymerization reactor finishing processes (such as extrusion of polymer product that is in an at least partially molten state, followed by pelletization). Additives are commonly blended into the polymer product as part of this finishing process, such that the polymer pellets comprise the polymer itself and one or more additives.

Common additives, particularly for polymers such as polyethylenes intended for use as films, sacks, and other similar articles, include polymer processing aids (PPAs), which help make the pellets easier to manipulate in downstream manufacturing processes (such as extrusion, rolling, blowing, casting, and the like). Adequate amounts of PPA, among other things, help eliminate melt fractures in films made from the polymer pellets. This is particularly so for polymer pellets exhibiting relatively higher viscosity in extrusion processes. Melt fracture is a mechanically-induced melt flow instability which occurs, e.g., at the exit of an extrusion die and typically in conditions of high shear rate. Pinhole, linear, and annular die geometries are among those that can induce melt fracture. There are different mechanical regimes that describe PE melt fracture, but all manifest as a very rough polymer surface which persists as the polymer crystallizes. Commonly in the blown film industry, a rough array of sharkskin like patterns develop on the film surface, often with a characteristic size from the mm to cm scale, and they depend on both the flow profile and rheology of the polyolefin polymer (e.g., polyethylene).

Melt fracture can adversely affect film properties, distort clarity, and reduce gauge uniformity. Thus, melt fracture-prone polymer grades, as noted, often rely on a PPA.

The most common PPAs are or include fluoropolymers (fluorine-containing polymers). It is, however, desired to find alternative PPAs that do not include fluoropolymers and/or fluorine, while maintaining the effectiveness of fluoropolymer-based PPAs in preventing melt fractures.

Some references of potential interest in this regard include: U.S. Pat. Nos. 10,982,079; 10,242,769; 10,544,293; 9,896,575; 9,187,629; 9,115,274; 8,552,136; 8,455,580; 8,728,370; 8,388,868; 8,178,479; 7,528,185; 7,442,742, 6,294,604; 5,015,693; and 4,540,538; U.S. Patent Publication Nos. 2005/0070644, 2008/0132654, 2014/0182882, 2014/0242314, 2015/0175785, 2020/0325314; as well as WO2022/079601; WO2022/076296; WO2020/146351; EP3234004; WO2011/028206, CN104558751, CN112029173, KR10-2020-0053903, CN110317383, JP2012009754A, WO2017/077455, CN108481855, CN103772789.

SUMMARY

The present disclosure relates to polymer compositions, their methods of manufacture, and articles including and/or made from the polymer compositions. In a particular focus, the polymer compositions may be polyolefin compositions, such as polyethylene compositions. The polymer compositions can also include a PPA that is preferably free or substantially free of fluorine; and, similarly, the entire polymer compositions can be free or substantially free of fluorine. In this context, "substantially free" permits trace amounts (e.g., 10 ppm or less, preferably 1 ppm or less, such as 0.1 ppm or less) of fluorine, e.g., as an impurity, but well below the amount that would intentionally be included in a polymer composition via such additives (e.g., about 100 ppm of fluorine atoms by mass of polymer product in a typical case where such additives are included). In various embodiments, the polymer compositions can be, e.g., polymer pellets; a polymer melt (as would be formed in an extruder such as a compounding extruder); reactor-grade polymer granules and/or polymer slurries; or other form of polymer composition containing the PPA and optionally one or more other additives.

The present disclosure also relates to films and/or other end-use articles made from such polymer compositions, and, in particular instances, can relate to cast or blown films, preferably blown films. Thus, the polyolefin compositions (e.g., polymer pellets) of various embodiments, and/or films or other articles made therefrom (e.g., blown films), are themselves free or substantially free of fluorine (or, at a minimum, free or substantially free of fluorine-based PPA). A fluorine-based PPA, as used herein, is a polymer processing aid or other like polymeric additive containing fluorine.

The present inventors have found several compounds to be effective in replacing fluorine-based PPAs, including: (i)

polyethylene glycol (PEG) (e.g., a PEG having molecular weight less than 40,000 g/mol); (ii) a surfactant comprising a lipophilic moiety and a hydrophilic moiety (e.g., a sorbitan ester or a polysorbate, such as polysorbate 20, polysorbate 40, polysorbate 60, polysorbate 80, or combinations thereof); and (iii) metal salts of fatty acids (e.g., zinc salts of fatty acids, such as zinc stearate). Further, it is surprisingly found that blends of two or more of the foregoing compounds (e.g., blends of a metal salt of a fatty acid with either or both of PEG and a surfactant; or blends of PEG and a surfactant; blends of all three; etc.) can provide particular advantages over single-component PPAs (especially any one of the compounds (i), (ii), or (iii) alone), such advantages including one or more of: (1) reducing or minimizing fouling of extruder components (as compared to single-compound PPAs) while still successfully preventing melt fractures; (2) easier processing as compared to incumbent fluorine-containing PPAs; and/or (3) faster elimination of melt fracture in films formed from polymer compositions comprising the inventive PPA blends. Thus, polyolefin compositions of various embodiments comprise an olefin-based polymer and from 200 to 10000 ppm of a PPA comprising at least 99 wt % of a blend of two or more of the following, optionally all three of the following: (i) a polyethylene glycol (and in particular PEG having molecular weight less than 40,000 g/mol); (ii) a surfactant comprising a sorbitan ester or a polysorbate; and (iii) a metal salt of a fatty acid. Further, each component of the blend is individually present in the polymer composition in an amount within the range from 100 to 9900 ppm. And, while polymer compositions of certain embodiments may include other additives (for example, antioxidants, stabilizers, slip agents; also potentially including even other PPAs such as fluorine-based PPAs) in addition to the PPA blend, in preferred embodiments—as just noted above—the polymer composition is free or substantially free of fluorine. It is also, according to some embodiments, free or substantially free of PPAs other than the aforementioned PPA comprising the blend.

The present inventors have also surprisingly found that the method of introducing the PPA into the polymer composition can affect ease of processing the polymer composition. Accordingly, the invention in some embodiments resides in methods of mixing PPA, comprising melt blending the PPA composition and a polymer (e.g., a homopolymers or copolymer of two or more $C_2$ to $C_{20}$ α-olefins, such as a polyethylene homopolymers or copolymer), such as in an extruder at elevated temperatures (e.g., 200° C. or higher). For example, such methods include melt-blending; and/or coextruding the PPA and polymer (and optional other additives) in a compound extruder, and pelletizing the mixture upon its exit from the extruder, thereby locking in the homogeneity of the blend.

Embodiments also include films, especially blown films, made from polymer compositions as just described above.

DETAILED DESCRIPTION

Definitions

Figure 1:
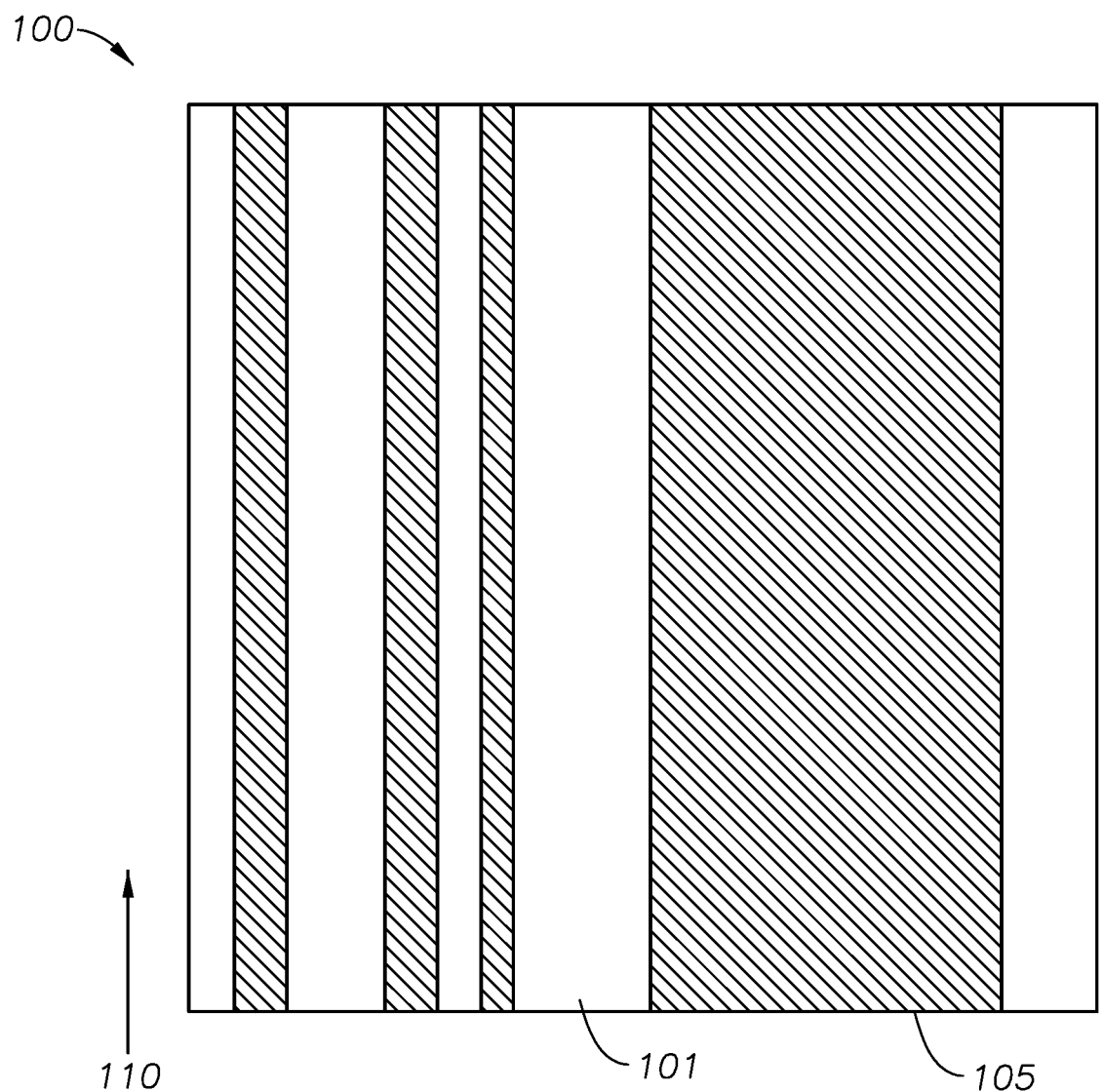
FIG. 1 is a schematic conceptually illustrating streaks of melt fractures and stripes of regions with melt fractures eliminated in a blown film during extrusion.

For the purposes of the present disclosure, various terms are defined as follows.

The term "polyethylene" refers to a polymer having at least 50 wt % ethylene-derived units, such as at least 70 wt % ethylene-derived units, such as at least 80 wt % ethylene-derived units, such as at least 90 wt % ethylene-derived units, or at least 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefin(s) and/or comonomer(s).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 50 wt % to 55 wt %, it is understood that the mer unit in the copolymer is derived from ethylene in the polymerization reaction and said derived units are present at 50 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically.

The term "alpha-olefin" or "α-olefin" refers to an olefin having a terminal carbon-to-carbon double bond in the structure thereof $R^1R^2C{=}CH_2$, where $R^1$ and $R^2$ can be independently hydrogen or any hydrocarbyl group; such as $R^1$ is hydrogen and $R^2$ is an alkyl group. A "linear alpha-olefin" is an alpha-olefin wherein $R^1$ is hydrogen and $R^2$ is hydrogen or a linear alkyl group. For the purposes of the present disclosure, ethylene shall be considered an α-olefin.

As used herein, the term "extruding" and grammatical variations thereof refer to processes that include forming a polymer and/or polymer blend into a melt, such as by heating and/or sheer forces, and then forcing the melt out of a die in a form or shape such as in a film, or in strands that are pelletized. Most any type of apparatus will be appropriate to effect extrusion such as a single or twin-screw extruder, or other melt-blending device as is known in the art and that can be fitted with a suitable die. It will also be appreciated that extrusion can take place as part of a polymerization process (in particular, in the finishing portion of such process) as part of forming polymer pellets; or it can take place as part of the process for forming articles such as films from the polymer pellets (e.g., by at least partially melting the pellets and extruding through a die to form a sheet, especially when combined with blowing air such as in a blown film formation process). In the context of the present disclosure, extrusion in the finishing portion of polymerization processes may be referred to as compounding extrusion, and typically involves feeding additives plus additive-free (reactor grade) polymer to the extruder; while extrusion of polymer to make articles (e.g., extrusion of polymer pellets to make films) takes place conceptually "downstream" (e.g., at a later point, after polymer product has been formed including through compounding extrusion), and typically involves feeding optional additives plus additive-containing polymer to the extruder.

Polymers

In various embodiments, polymer compositions include one or more polymers, preferably polyolefin polymers. Examples include homopolymers (e.g., homopolymers of a $C_2$ to $C_{10}$ α-olefin, preferably a $C_2$ to $C_6$ α-olefin). Particular examples of homopolymers include homopolyethylene and polypropylene (hPP). Taking for example homopolyethylene, such a polymer may be produced, e.g., by free radical polymerization in a high-pressure process, resulting typically in a highly branched ethylene homopolymer—often known as LDPE (low density polyethylene), having density less than 0.945 g/cm$^3$, often 0.935 g/cm$^3$ or less, such as within the range from 0.900, 0.905, or 0.910 g/cm$^3$ to 0.920, 0.925, 0.927, 0.930, 0.935, or 0.945 g/cm$^3$. Unless otherwise noted herein, all polymer density values are determined per ASTM D1505. Samples are molded under ASTM D4703-10a, procedure C, and conditioned under ASTM D618-08 (23°±2° C. and 50±10% relative humidity) for 40 hours before testing.

In another example, ethylene monomers may be polymerized via known gas, slurry, and/or solution phase polymerization (e.g., using catalysts such as chromium-based catalysts, or single-site catalysts such as Ziegler-Natta and/or metallocene catalysts, all of which are well known in the art of polymerization and not discussed further herein. Where a more highly linear ethylene homopolymer is produced (e.g., using gas or slurry phase polymerization with any of the above noted catalysts), it may be referred to as HDPE (high density polyethylene), typically having density 0.945 g/cm$^3$ or greater, such as within the range from 0.945 to 0.970 g/cm$^3$.

Yet further polymer examples include copolymers of two or more $C_2$ to $C_{40}$ α-olefins, such as $C_2$ to $C_{20}$ α-olefins, such as ethylene-α-olefin copolymers, or propylene-α-olefin copolymers (e.g., propylene-ethylene copolymers, or propylene-ethylene-diene terpolymers, sometimes known as EPDMs or PEDMs). Particular examples contemplated herein include copolymers of ethylene and one or more $C_3$ to $C_{20}$ α-olefin comonomers, such as $C_4$ to $C_{12}$ α-olefin comonomers (with 1-butene, 1-hexene, 1-octene, or mixtures of two or more of them being preferred in various embodiments). An ethylene copolymer (e.g., a copolymer of ethylene and one or more $C_3$ to $C_{20}$ α-olefins) can include ethylene-derived units in an amount of at least 80 wt %, or 85 wt %, such as at least 90, 93, 94, 95, or 96 wt % (for instance, in a range from a low of 80, 85, 90, 91, 92, 93, 94, 95, 96, or 97 wt %, to a high of 94, 95, 95.5, 96, 96.5, 97, 97.5, or 98 wt %, with ranges from any foregoing low value to any foregoing high value contemplated (provided the high is greater than the low) based on a total amount of ethylene-derived units and comonomer-derived units. For instance, the ethylene copolymer can include 94 or 95 wt % to 97 or 98 wt % ethylene-derived units based on the total amount of ethylene-derived units and comonomer-derived units. The balance of the copolymer (on the basis of ethylene-derived units and comonomer-derived units) is comprised of the comonomer-derived units. For example, comonomer units (e.g., $C_2$ to $C_{20}$ α-olefin-derived units, such as units derived from butene, hexene, and/or octene) may be present in the ethylene copolymer from a low of 2, 2.5, 3, 3.5, 4, 4.5, 5, or 6 wt %, to a high of 3, 4, 5, 6, 7, 8, 9, 10, 15, or 20 wt %, with ranges from any foregoing low to any foregoing high contemplated (provided the high is greater than the low value).

For ethylene-based, propylene-based, or other α-olefin based copolymers, several suitable comonomers were already noted, although in various embodiments, other α-olefin comonomers are contemplated. For example, the α-olefin comonomer can be linear or branched, and two or more comonomers can be used, if desired. Examples of suitable comonomers include linear $C_3$-$C_{20}$ α-olefins (such as butene, hexene, octene as already noted), and α-olefins having one or more $C_1$-$C_3$ alkyl branches, or an aryl group. Examples can include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. In some embodiments, comonomers include propylene, 1-butene, 1-pentene, 4-methyl-1-pentene, 1-hexene, 1-octene and styrene.

In particular embodiments, the polymer can comprise or can be an ethylene copolymer (per those described above). The ethylene copolymer can be produced in gas, slurry, or solution phase polymerization, and some particularly preferred ethylene copolymers can be produced in gas or slurry phase polymerization. A particular example is a linear-low density polyethylene (LLDPE), a copolymer of ethylene and one or more α-olefins polymerized in the presence of one or more single-site catalysts, such as one or more Ziegler-Natta catalysts, one or more metallocene catalysts, and combinations thereof. Such LLDPE can have density within the range from a low of 0.900, 0.905, 0.907, 0.910 g/cm$^3$ to a high of 0.920, 0.925, 0.930, 0.935, 0.940, or 0.945 g/cm$^3$. LLDPE can be distinguished from the above-mentioned LDPE in several respects, many of which are well known in the art, including the degree of branching (sometimes referred to more specifically as long-chain branching) in the produced polymer, noting that LLDPE has substantially less (often little, if any) long chain branching. In particular embodiments, the polymer of the polymer composition is or includes a metallocene-catalyzed LLDPE (mLLDPE).

Further, it may be particularly advantageous to deploy the PPA blend in a polymer composition comprising one or more polymers (e.g., ethylene homopolymers or copolymers) having particular rheology characteristics. For instance, according to some embodiments, the polymer (e.g., ethylene homopolymers or copolymers) of the polymer composition has MI of 5.0 g/10 min or less, preferably 2.5 g/10 min or less, such as 1.0 g/10 min or less, or within the range from 0.1, 0.2, or 0.5 g/10 min to 1.0, 1.2, 1.5, 2.0, 2.5, 3.0, 4.0, or 5.0 g/10 min (with ranges from any low to any high contemplated).

Melt index ratio (MIR) is another polymer characteristic of potential interest in this regard. MIR is herein defined as the ratio of high load melt index (HLMI) (determined per ASTM D1238 at 190° C., 21.6 kg loading) to melt index, or HLMI/MI. Polymers of some embodiments can have MIR within the range from 10, 12, or 15 to 20, 25, 27, 28, or 30. In yet other embodiments, MIR may be greater than 25, or greater than 27, or greater than 30, such as within the range from 25, 27, 30, 35 or 37 to 35, 40, 45, 50, 55, 60, 65, 70, 75, 80, 85, 90, 95, or 100 (with ranges from any foregoing low end to any foregoing high end contemplated, provided the high end is greater than the low end, e.g., 25 to 35, 27 to 40, or 30 to 90).

Also or instead, density of the polymer may in some embodiments be within the range from 0.905 to 0.945 g/cm$^3$, such as within the range from a low of any one of 0.905, 0.907, 0.908, 0.910, 0.911, 0.912, 0.913, 0.914, or 0.915 g/cm$^3$ to a high of any one of 0.916, 0.917, 0.918, 0.919, 0.920, 0.924, 0.926, 0.930, 0.935, 0.940 or 0.945 g/cm$^3$, with ranges from any foregoing low to any foregoing high contemplated herein (e.g., 0.910 to 0.925 or 0.935 g/cm$^3$, such as 0.912 to 0.925, or 0.915 to 0.918 g/cm$^3$). In yet other embodiments, the polymer may be of higher density (e.g., HDPE), having density within the range from 0.945 g/cm$^3$ to 0.970 g/cm$^3$.

PPA Blends

Various compounds show promise as replacements of incumbent fluorine-containing PPAs, including: polyethylene glycol (PEG) (e.g., a PEG having molecular weight less than 40,000 g/mol); (ii) a surfactant comprising a lipophilic moiety and a hydrophilic moiety (e.g., a sorbitan ester or a polysorbate, such as polysorbate 20, polysorbate 40, polysorbate 60, polysorbate 80, or combinations thereof); and (iii) metal salts of fatty acids (e.g., zinc salts of fatty acids, such as zinc stearate).

All three types of compounds have demonstrated promising results in preventing surface defects such as melt fracture in forming blown films from a polymer composition containing each such compound individually. However, all three types of PPA options have also demonstrated the potential for die lip buildup, the process by which heterogeneous material attaches to surfaces of an extruder die (e.g., at the exit of a blown film extruder) during the process of extruding a polymer melt to make film. This die lip buildup occurs in spite of the polymer melt flow, and gradually accumulates over time. This can introduce undesirable surface fouling, surface roughness, partial die exit blockage, potential gel release events, and the total oxidation of the stagnant material. It is believed that these PPA options, employed individually, can exhibit die lip buildup over several hours. For instance, such buildup is observed in mLLDPE including 1000 ppm of PEG having nominal molecular weight of 8000 g/mol (sometimes referred to by the shorthand PEG 8000); and likewise in mLLDPE including 1000 ppm of a polysorbate 60; and likewise in mLLDPE including 1000 ppm of zinc stearate, a metal salt of a fatty acid).

It is preferable for die buildup to take several days to substantially occur, perhaps 3-8 days, and ideal for it to never occur at all. When such buildup occurs on a film conversion line, the line typically must undergo maintenance to remove the die lip buildup, such that rapid buildup translates to costly equipment downtime.

The inventors have solved this problem by employing a blend in the PPA. It is recognized that each type of these three compounds can serve to eliminate melt fractures. It is furthermore believed that, when combined, at minimum their melt fracture elimination contributions are additive. For example if the melt fracture elimination capability of 1000 ppm of polyethylene glycol is roughly equivalent to that of 1000 ppm of polysorbate 60, then an equivalent formulation would also be 500 ppm of each of these two components. However, by reducing the loading level of any one additive, the potential for die lip buildup is lower, and the line may run longer before routine maintenance is needed to remove the buildup. It is in this manner that the blends employed according to various embodiments herein achieve a surprising advantage over any one blend component alone.

Moreover, additional synergistic effects may be realized with some blends. For example, the low melting temperatures of, e.g., polysorbate 60 and PEG 8000 have sometimes been problematic for mixing. Blending either or both with the metal salt of a fatty acid (e.g., zinc stearate) can inhibit such compounds from beading up in the liquid state before the polymer is fully molten, aiding in homogenous mixing of the PPA with the polymer in the polymer composition. After all, the metal ions of the metal salt would be expected to introduce some polarity, which in turn would partly inhibit their phase separation.

Accordingly, a polymer composition according to various embodiments comprises a PPA that in turn comprises at least 99 wt % (preferably at least 99.9 wt % or 100 wt %, where the wt % are on the basis of total mass of the PPA) of a blend comprising at least two of the (i) polyethylene glycol; (ii) surfactant comprising a sorbitan ester or a polysorbate; and (iii) metal salt of a fatty acid. The PPA can be deployed in the polymer composition in an amount within the range from 200 to 15000 ppm, such as within the range from a low of any one of 200, 250, 300, 350, 400, 450, 500, 550, 600, 650, 700, 750, 800, 900, 950, 1000, 1100, 1200, 1250, and 1500 ppm to a high of any one of 400, 500, 600, 700, 800, 900, 1000, 1100, 1200, 1300, 1400, 1500, 1600, 1700, 1800, 1900, 2000, 2500, 3000, 3500, 4000, 4500, 5000, 7500, 10000, 12500, and 15000 ppm, with ranges from any foregoing low to any foregoing high contemplated, provided the high end is greater than the low end (e.g., 200 to 10,000 ppm, such as 400 to 3,000 ppm; or 500 to 1500 ppm, such as 500 to 1200 ppm, or 600 to 1200 ppm). All ppm values are on the basis of total mass of the polymer composition. Moreover, the PPA can consist essentially of the blend (wherein "consists essentially of" means that up to 10 ppm of impurities are permitted).

In various embodiments, the PPA may be deployed in the polymer composition in amounts that vary according to some of the polymer's properties, and in particular its MI and/or MIR. This can be the case, for example, with some polyethylene polymers. Relatively more of the PPA blend can be employed with polymer having relatively lower MI and/or higher MIR (which may indicate the presence of some degree of long-chain branching, particularly in polyethylenes such as LLDPEs). For instance, where the polymer (especially a polyethylene, such as an ethylene copolymer) has MI from 0.4 to 1.2 g/10 min (ASTM D1238 at 190° C., 2.16 kg loading) and/or melt index ratio (MIR) within the range from 10 to 25, then the PPA may preferably be deployed at 600-1600 ppm loading. On the other hand, for such polymers with MI less than 0.4 and/or MIR greater than 25, a higher PPA loading may be desired to ensure quick elimination of melt fracture (e.g., within the range from 1000 to 2000 ppm of PPA).

Each component (i), (ii), and (iii) of the PPA blend, if present, individually can be present in the polymer composition in an amount within the range from 100 to 9900 ppm (on the basis of total mass of the polymer composition), such as from a low of any one of 100, 150, 200, 250, 300, 350, 400, or 450 ppm to a high of any one of 200, 250, 300, 350, 400, 450, 500, 600, 700, 800, 900, 1000, 1100, 1200, 1300, 1400, 1500, 1600, 1700, 1800, 1900, 2000, 2500, 2750, 3000, 3500, 4000, 4500, 5000, 5500, 6000, 7000, 8000, 9000, 9500, 9600, 9700, 9800, 9900, or 10000 ppm, with ranges from any foregoing low to any foregoing high contemplated, provided the high end is greater than the low end (e.g., 200 or 250 ppm to 300, 400, 500, 1000, 1250, or 1500 ppm).

Furthermore, each component need not be present in the blend at the same amount relative to other components. Each range presented above is to be taken individually for a given component. For example, in some cases when the blend includes the (iii) metal salt, it may be advantageous to include the metal salt in a ratio (amount of metal salt (ppm) to amount of other blend component(s) (ppm)) that is at least 1:1, preferably greater than 1:1 (that is, the amount of metal salt in the polymer composition is greater than the amount of either or both of PEG or surfactant in the polymer composition). This ratio ((a) amount of metal salt to (b) amount of PEG and/or surfactant in the polymer composition) can preferably be within the range from 1:1 to 5:1, such as from a low of any one of 1.1:1, 1.2:1, 1.3:1, 1.4:1, 1.5:1, or 1.75:1 to a high of any one of 2:1, 2.25:1, 2.5:1, 3:1, 4:1, 5:1, 8:1, 9:1, or 10:1. In embodiments where the blend comprises (iii) metal salt and (i) PEG, the PPA is preferably deployed in the polymer composition in amounts of at least 1100 ppm or 1150 pm, such as at least 1200 ppm, such as within the range from 1150 or 1200 ppm to 1800, 2000, 2500, or 3000 ppm.

In some embodiments, the blend comprises the (iii) metal salt and the (ii) surfactant, preferably in a 1:1 or greater ratio of metal salt to surfactant (such as within the range from 1:1 to 4:1, 5:1, or 6:1). That is, the blend comprises at least 50 wt % of the metal salt. Preferably, such blends may comprise 350 to 1000 ppm of each of the metal salt and the surfactant (provided the relative amounts remain in the just-describe ratios), and can be employed as a PPA blend at loadings of 700 to 2000 ppm, such as 750 to 1250 ppm, all such ppm on the basis of mass of the polymer composition in which the PPA blend is deployed.

In yet further embodiments, the blend includes the (ii) surfactant. Preferably, the surfactant is present in such a blend in amounts of 50 wt % or less, on the basis of mass of the blend (e.g., within a range from a low of 1, 5, 7, 10, 15, 20, 25, or 30 wt % to a high of 15, 20, 25, 30, 35, 40, 45, or 50 wt %, with ranges from any foregoing low end to any foregoing high end contemplated, provided the high end is greater than the low end). Specific examples of surfactant (e.g., polysorbates such as polysorbate 60) are discussed in more detail below. The other blend component in such embodiments can be a metal salt (e.g., such that the balance of the blend of such embodiments is the metal salt); or, in some particular embodiments, the other blend component is PEG, such that the balance of the blend comprises PEG.

Total loading of PPA comprising a blend of such embodiments (comprising surfactant at 50 wt % or less and the balance metal salt or PEG) may be in accordance with PPA loading already described above, noting that some particular of these embodiments entail PPA loading within the range from 800, 900, 950, or 1000 ppm to 1400, 1600, 1800, or 2000 ppm.

Thus, a particular example blend of such embodiments comprises surfactant (e.g., polysorbate, such as polysorbate 60) at 50 wt % or less (on the basis of total mass of the blend) and the balance PEG, with preferred PEG:surfactant ratios within the range from 1:1 to about 5:1 (e.g., about 15-50 wt % surfactant and the balance PEG).

According to yet further embodiments, however, when the blend comprises PEG and surfactant, the ratio may not be of particular importance, such that ratio of PEG to surfactant may be within the range from 0.20 to 6.0; even with a majority of surfactant (e.g., more than 50 wt % surfactant in the blend), the blend may achieve desired processing benefits across a wide range of blend component ratios and a range of amounts of PPA, providing a robust fluorine-free PPA solution that can be applied to polymer compositions with a wide range of properties. For instance, as discussed herein, although some PPAs require different deployment levels for polymers having different melt index ratio (MIR) values (e.g., such that higher MIR values may require higher PPA loading), a PEG/surfactant blend can have similar deployment across a wide spectrum of polymers, including those having both relatively high and relatively low MIR values, such as within the MIR range from 10-90.

For illustration purposes, it is noted that some example blends include, e.g., 1100-2000 ppm total of a metal salt of a fatty acid (e.g., zinc stearate) and PEG (e.g., Pluriol® E 8000 from BASF) in a ratio of metal salt:PEG within the range from 1:1 to 4:1, preferably 1:1 to about 2:1; or 800 to 1600 ppm total of PEG and surfactant (e.g., polysorbate 60, such as Avapol™ 60K from Avatar Corporation) in a ratio of PEG:surfactant within the range from 1:1 to 4:1; 500 ppm of the metal salt and 250 ppm each of PEG and surfactant.

Each potential component of the blend, i.e., (i) PEG, (ii) surfactant, and (iii) metal salt of a fatty acid, is discussed in more detail below.

PEG Blend Components

It is noted that PEG is a component in some known fluoropolymer-based PPAs (see, e.g., EP3908627 and higher-molecular weight PEG (often referred to as polyethylene oxide or PEO, see below for more details) has been suggested as a required blend partner (optionally among other ingredients) with metal salts of particular acids or alkylsulfate, in other PPAs (see, e.g., EP3234004). However, the present inventors have found particular lower molecular weight varieties of polyethylene glycol are useful in the PPA blends of various embodiments, especially without fluorine-based components. Thus, per the present disclosure, when PEG is present in the PPA blend, substantially all PEG in the blend has molecular weight less than 40,000 g/mol.

As used herein, polyethylene glycol or PEG refers to a polymer expressed as H—(O—CH$_2$—CH$_2$)$_n$—OH, where n represents the number of times the O—CH$_2$—CH$_2$ (oxyethylene) moiety is repeated; n can range widely, because PEG comes in a wide variety of molecular weights. For instance, n can be about 33 for lower-molecular weight polyethylene glycols (~1500 g/mol), ranging up to about 227 for higher molecular weight polyethylene glycols (~10,000 g/mol) such as about 454 for ~20,000 g/mol molecular-weight PEG; and 908 for ~40,000 molecular-weight PEG; and even higher for higher-molecular-weight PEG varieties.

It is also noted that PEG can equivalently be referred to as polyethylene oxide (PEO) or polyoxyethylene (POE). Sometimes in industry parlance, PEG is the nomenclature used for relatively lower molecular weight varieties (e.g., molecular weight 20,000 g/mol or less), while polyethylene oxide or PEO is used for higher-molecular-weight varieties (e.g., above 20,000 g/mol). However, for purposes of the present application, references to polyethylene glycol or PEG should not, alone, be taken to imply a particular molecular weight range, except where a molecular weight range is explicitly stated. That is, the present application may use the terms polyethylene glycol or PEG to refer to a polymer having structure H—(O—CH$_2$—CH$_2$)$_n$—OH with n such that the polymer's molecular weight is less than 20,000 g/mol, and it may also use the terms polyethylene glycol or PEG to refer to such a polymer with n such that the polymer's molecular weight is greater than 20,000 g/mol, such as within the range from 20,000 to 40,000 g/mol.

PEG "molecular weight" as used herein refers to weight-average molecular weight (Mw) as determined by gel permeation chromatography (GPC), and PEG "molecular weight distribution" or MWD refers to the ratio of Mw to number-average molecular weight (Mn), i.e., Mw/Mn. PEG compositions for use in PPAs may advantageously have narrow MWD, such as within the range from a low of any one of about 1.0, 1.1, 1.2, 1.3, 1.4, or 1.5 to a high of any one of about 1.1, 1.2, 1.3, 1.4, 1.5, 1.6, 1.7, 1.8, 1.9, 2.0, 2.5, or 3.0, with ranges from any foregoing low end to any foregoing high end contemplated, provided the high end is greater than the low end (e.g., 1.0 to 2.0, or 1.0 to 1.5, such as 1.0 to 1.2 or even 1.0 to 1.1). For instance, PEG compositions having MWD of about 1 to 1.1 or 1.2 may be particularly useful. However, obtaining such a uniform length of polymer chains (i.e., narrow MWD) can be expensive; thus, commercially available PEG compositions might have broader MWD values (e.g., ranging from 1 to 3, 4, 5, or even greater). Such PEG compositions are therefore also within the scope of the invention. These PEG compositions can still suitably be employed in PPA blends, potentially (but not necessarily) compensating by increasing the PEG loading (and/or other blend component loading) for such broader-MWD PEGs (e.g., 700-1400 ppm total PPA, as compared to loadings as low as 400-700 ppm total PPA that may be suitable for narrower-MWD PEGs).

In embodiments employing narrow MWD PEG, Mw values for PEG will commonly be in relatively close agreement with Mn (e.g., within 10%); regardless, however, where differences between the two (Mw and Mn) exist, Mw should control as the preferred "molecular weight" measurement for purposes of the present disclosure. It is also noted that many commercial PEG compounds include a nominal molecular weight (e.g., "PEG 3K" or "PEG 10K" indicating nominal 3,000 g/mol and 10,000 g/mol molecular weights, respectively). Again, Mw of the PEG should control over any contrary nominal indicator.

As noted, particularly preferred PEGs are those having molecular weight less than 40,000 g/mol; such as within the range from a low of any one of 500, 600, 700, 800, 900, 1000, 1500, 2000, 2500, 3000, 3500, 4000, 4500, 5000, 5500, 6000, 7000, 8000, 8500, 9000, 9500, 10000, 12500, and 15000 g/mol to a high of any one of 7000, 7500, 8000, 8500, 9000, 9500, 10000, 10500, 11000, 11500, 12000, 12500, 15000, 20000, 22000, 25000, 30000, 35000, 39000, and 39500 g/mol, provided the high end is greater than the low end, and with ranges from any foregoing low end to any foregoing high end generally contemplated (e.g., 1,500 to 35,000 g/mol, or 5,000 to 20,000 g/mol, such as 5,000 to 12,000 g/mol or 6,000 to 12,000 g/mol). Particular higher or lower sub-ranges may also be suitable (e.g., PEG having Mw of 1,500 to 5,500 g/mol; or PEG having Mw of 5,000 to 12,000 g/mol; or PEG having Mw of 10,000 to 20,000 g/mol; or PEG having Mw of 15,000 to 25,000 g/mol; or PEG having Mw of 25,000 to 35,000 g/mol). Thus, in various embodiments, all or substantially all PEG in the polymer composition (if present) should have molecular weight within one of the aforementioned ranges.

Commercially available examples of suitable polyethylene glycols, especially those of lower molecular weight, include Pluriol® E 1500; Pluriol® E 3400; Pluriol® E 4000; Pluriol® E 6000; Pluriol® E 8000; and Pluriol® E 9000 polyethylene glycols available from BASF (where the numbers represent nominal molecular weights of the PEG); and also include Carbowax™ 8000, Carbowax™ Sentry™ 8000 NF EP available from Dow.

Measuring Moments of Molecular Weight

Unless otherwise indicated, the distribution and the moments of molecular weight are determined by using Agilent 1260 Infinity II Multi-Detector GPC/SEC System equipped with multiple in-series connected detectors including a differential refractive index (DRI) detector, a viscometer detector, a two-angle light scattering (LS) detector and a UV diode array detector. Two Agilent PLgel 5-µm Mixed-C columns plus a guard column are used to provide polymer separation. THF solvent from Sigma-Aldrich or equivalent with 250 ppm of antioxidant butylated hydroxytoluene (BHT) is used as the mobile phase. The nominal flow rate is 1.0 ml/min and the nominal injection volume is 25 µL. The whole system including columns, detectors and tubings operates at 40° C. The column calibration was performed by using twenty-three polystyrene narrow standards ranging from 200 to 4,000,000 g/mole.

The Agilent Multi-Detector GPC Data Analysis Software is used to process data from any combination of DRI, light scattering and viscometer detectors to obtain information about polymer properties. Here, the light scattering MW is calculated by combining the concentration measured by DRI and the Rayleigh ratio measured by LS in each elution volume slice plus the detector calibration constants and polymer parameters such as refractive index increment (dn/dc). For the poly (ethylene glycol) samples used in the patent, the dn/dc is determined to be around 0.07 ml/g in THF solvent.

Surfactant Blend Components

Most generally, suitable surfactants comprise a hydrophilic head and a lipophilic tail. As used herein, a hydrophilic head refers to a moiety having a polar, or hydrophilic, nature; and a lipophilic tail refers to a moiety, having an apolar, or lipophilic (alternatively, hydrophobic) nature. A lipophilic tail is so-named because it typically comprises a hydrocarbon chain of at least 3, 4, or 5 carbons in length. The heads and tails of surfactants can be composed of many different types and sizes of molecules, which are often adjusted to tune their solubility. Surfactants are a suitable option as a PPA blend component because they can be adjusted for their solubility in a polymer melt (e.g., melt polyethylene polymer); they can be apolar enough to be homogenized into the polymer of the melt, but polar enough to tend to migrate to metallic surfaces through which the melt is being passed, to form lubricating coatings.

One class of surfactants that gains particular focus herein is sorbitan esters, comprising an apolar carboxylic acid (a "lipophilic tail") attached by ester linkage to a polar sorbitan group (the "hydrophilic head" of such molecules). Also of interest are polyoxyethylene derivatives of sorbitan esters, which include a plurality of polyoxyethylene oligomers chemically substituted onto the sorbitan group. These polyoxyethylene derivatives of sorbitan esters may also be referred to as polysorbates.

More particularly, the polyoxyethylene derivative of sorbitan ester (also referred to as a polysorbate) can take the form of Formula (I):

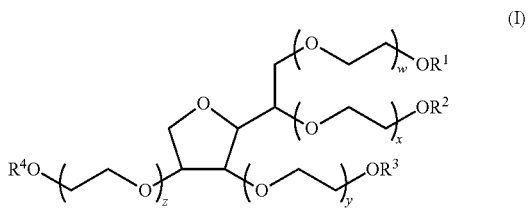

(I)

where: one of $R^1$-$R^4$ is a straight chain fatty acid moiety, and the other three of $R^1$-$R^4$ are each hydrogen; and w, x, y, and z are integers such that $10 \leq w+x+y+z \leq 40$; preferably $15 \leq w+x+y+z \leq 25$; more preferably $w+x+y+z=20$. The straight chain fatty acid moiety is preferably of the formula (C=O)$(CH_2)_a CH_3$, where a is an integer between 10 and 25 (inclusive), preferably between 12 and 18 (inclusive), although the fatty acid moiety may instead include a double-bond along the hydrocarbon chain (that is, it may include a monounsaturation), such that the formula is (C=O)$(CH_2)_b$(CH)=(CH)$(CH_2)_c CH_3$, where b and c are each integers and b+c add to an integer between 8 and 23 (inclusive), preferably between 10 and 16 (inclusive). The skilled artisan will further recognize that the hydrocarbon chain may include two or more unsaturations in alternate embodiments, although it is preferred to maintain unsaturations at 4 or less, more preferably 3 or less, most preferably 0, 1, or 2 (e.g., to minimize potential for oxidation of the surfactant, thereby maximizing thermal stability).

Specific examples of polysorbates include polysorbate 20 (polyoxyethylene (20) sorbitan monolaurate); polysorbate 40 (polyoxyethylene (20) sorbitan monopalmitate); polysorbate 60 (polyoxyethylene (20) sorbitan monostearate); and polysorbate 80 (polyoxyethylene (20) sorbitan monooleate). The 20, 40, 60, and 80 following "polysorbate" indicate the type of fatty acid moiety (the "lipophilic tail" of the molecule) appended to the polyoxyethylene sorbitan moiety (the "hydrophilic head" of the molecule): 20 is monolaurate, 40 is monopalmitate, 60 is monostearate, and 80 is monooleate (an example of a mono-unsaturated fatty acid moiety). The "polysorbate #" names assume 20 oxyethylene moieties [that is, —$(CH_2CH_2O)$—] appended to the sorbate. The alternate detailed names (e.g., "polyoxyethylene (20) sorbitan monostearate") indicate the number of oxyethylene moieties substituted on the sorbitan (20) and the fatty acid moiety appended to one of those moieties (mono stearate).

In certain embodiments, the surfactant can be or can comprise one or more of polysorbate 20, polysorbate 40, polysorbate 60, and/or polysorbate 80. For instance, the surfactant can be or can comprise polysorbate 60.

Commercially available examples include Avapol™ 60K from Avatar Corporation (polysorbate 60); Tween™ 20 detergent from Sigma-Aldrich or Tween™ 20 Surfact-Amps detergent solution from Thermo Scientific™; and Tween™ 40 viscous liquid from Sigma-Aldrich (also known as food additive number E434 in the European Union).

Also or instead, a surfactant that is a variant of the particular polysorbates just described may be employed. For example, referring again to Formula I, two, three, or all of $R^1$-$R^4$ can each be a straight chain fatty acid moiety (with the remainder of $R^1$-$R^4$, if any, being hydrogen). An example of this class of compound includes polyoxyethylene sorbitan tristrearate, in which three of $R^1$ to $R^4$ are the fatty acid moiety stearate, and the other of $R^1$ to $R^4$ is hydrogen.

Finally, it is reiterated that in other embodiments, sorbitan esters may be employed in a polymer composition as a PPA blend component. Referring to Formula (I), w, x, y, and z would each be 0 (meaning no oxyethylene moieties are present). An example of such a compound is sorbitan tristearate, in which x, w, y, and z are each 0; three of $R^1$ to $R^4$ are the fatty acid moiety stearate, and the other of $R^1$ to $R^4$ is hydrogen.

Metal Salts of Fatty Acids

Fatty acids, as used herein, refer to carboxylic acid (formula R*—COOH, where R is alkyl or alkenyl), wherein R* is $C_8$ or greater (meaning the alkyl or alkenyl group comprises at least 4 carbon atoms). Preferably, R* is an aliphatic carbon chain having at least 4 carbons, such as at least 6 or at least 8 carbon atoms. It can be saturated or unsaturated (and, where unsaturated, can have one or more unsaturations). Examples include the following, where R*'s value is denoted as saturated carbon chains unless otherwise specifically noted to have one or more unsaturations: caprylic acid (where R* is $C_7$), capric acid (R* is $C_9$), lauric acid (R* is $C_{11}$), myristic acid (R* is $C_{13}$), palmitic acid (R* is $C_{15}$), oleic acid (R* is $C_{17}$, with a monounsaturation), stearic acid (R* is $C_{17}$), arachidic acid (R* is $C_{19}$), arachidonic acid (R* is $C_{19}$ with multiple unsaturations), erucic acid (R* is $C_{21}$, with a monounsaturation), behenic acid (R* is $C_{21}$), lignoceric acid (R* is $C_{23}$), and cerotic acid (R* is $C_{23}$).

A variety of suitable metals for forming a salt with the fatty acid are contemplated, including those of Groups 1 or 2 of the Periodic Table of the Elements (e.g., lithium, sodium, potassium, beryllium, magnesium, calcium). Also contemplated are metals with different valence such as aluminum and zinc.

Metal salts of particular interest include metal stearates, such as zinc stearate (although also contemplated are stearates of any other metal noted above). Zinc stearate can be of particular interest because of its common use in polymer compositions already, although it has not heretofore been used as such a major blend component in a fluorine-free PPA, and not in blends with surfactant and/or lower molecular-weight PEG as discussed above.

Along these lines, it is also noted that EP3234004 (referenced above) describes the use of zinc stearate (or other metal salts of various acids) as a thermal stabilizer for very high-molecular weight PEG compounds, as polymer processing additives. However, as also previously noted, that disclosure focuses on requiring high-molecular weight PEG in its compositions; and furthermore the reported amounts of zinc stearate, when used with PEG, are extremely small in comparison to the PEG (e.g., ratios of 3:100 zinc stearate: PEG), in contrast with the present findings that zinc stearate (or other metal salt of a fatty acid), when present in the blend, is preferably present at much higher levels (e.g., ratios of 1:1 or greater, as discussed above).

Methods of Introducing PPA Blend to Polymer Compositions

Methods in accordance with various embodiments include adding a PPA blend (according to the above description) to a polymer product (e.g., polymer granules and/or slurry) exiting a polymerization reactor to form a pre-finished polymer mixture in or upstream of a compounding extruder. The pre-finished polymer mixture therefore includes the polymer and PPA blend (both per above respective descriptions), as well as any optional other additives (which may be provided to the mixture along with, before, or after the surfactant). The pre-finished polymer mixture may, for example, be a polymer melt (e.g., formed in or just upstream of a compounding extruder). The mixture is then extruded and optionally pelletized to form a further polymer composition (e.g., polymer pellets) comprising the PPA blend and polymer (each per above, and with the PPA blend and its blend components in amounts in accordance with the above discussion), as well as any optional other additive(s).

Also or instead, methods may include mixing finished polymer (e.g., polymer pellets) with a PPA blend to form a polymer article mixture; and processing the polymer article mixture to form a film. Such processing may be in accordance with well-known methods in the art, and in particular in accordance with blown film extrusion.

Returning to embodiments related to compounding extrusion (e.g., as part of a finishing process to produce the polymer composition), methods in accordance with the present disclosure may be employed to line-up proper PPA dosing with different polymer grades, e.g., as may be produced as part of a polymer production campaign.

Such methods can include: at a first time, obtaining a first polymer reactor product from a polymerization reactor, the polymer reactor product having a first MIR and first MI; mixing a first portion of a PPA blend with the first polymer reactor product in a first PPA amount to form a first pre-finished polymer mixture; and extruding and optionally pelletizing the first pre-finished polymer mixture, thereby obtaining a first product comprising first finished polymer (e.g., first polymer pellets). Further, at a second time after the first time, a second polymer reactor product having second MI lower than the first MI (optionally, also or instead having MIR greater than the first MIR) is obtained from the polymerization reactor; and a second portion of the PPA blend is mixed with the second polymer reactor product in a second PPA amount that is greater than the first PPA amount. This forms the second pre-finished polymer mixture, which is extruded and optionally pelletized to form the second product comprising second finished polymer (e.g., second polymer pellets).

In methods of such embodiments, either or both of the first pre-finished polymer mixture and the first finished polymer product can be in accordance with the polymer compositions (comprising polymer and PPA blend) discussed herein. Likewise, either or both of the second pre-finished polymer mixture and the second finished polymer product can also be in accordance with the polymer compositions discussed herein. In particular, the polymer may be in accordance with those discussed above, such as ethylene homopolymers or copolymers.

In particular embodiments, the first polymer reactor product has MI greater than 0.45 g/10 min, and the second polymer reactor product has MI less than 0.45 g/10 min. Optionally, the first polymer reactor product can have MIR of 10-25; and the second polymer reactor product can have MIR greater than 25. Further, the first PPA amount can be within the range from 200, 300, 400 or 500 ppm to 550, 600, 650, 700, 750, 800, 900, 1000, 1100, or 1200 ppm; and the second PPA amount can be within the range from 1000 ppm to 1500 ppm, such as from 1000, 1100, or 1200 to 1300, 1400, 1450, or 1500 ppm.

The above methods and any other methods of mixing the PPA blend with polymer to form a polymer composition as described herein, also include adequately mixing the PPA into the polymer. The present inventors have surprisingly found that not all methods of mixing PPA may be sufficient; instead, the PPA should be melt blended at sufficiently high temperature and/or specific energy input (total mechanical energy forced into a polymer per unit weight, e.g., J/g, a metric for extent of mixing) with the polymer to achieve adequate homogenization among PPA blend components and polymer. For instance, melt-blending such as through melting and then co-extrusion of the PPA and polymer (e.g., in a compounding extruder) under elevated temperature (e.g., 150° C. or more, such as 200° C. or more) can achieve adequate homogenization, while simply melting the PPA and tumble-blending with polymer does not achieve adequate homogenization. Thus, methods of various embodiments include mixing the PPA and polymer (e.g., polyethylene) in a manner that ensures both components melt during the mixing (e.g., melt-mixing, coextrusion in a compound extruder). Preferred methods according to some embodiments include melt-blending and coextruding the PPA and polymer (and optional other additives) in a compound extruder, and pelletizing the mixture upon its exit from the extruder, thereby locking the homogenously blended mixture in place. More specifically, such methods can include: (a) feeding a PPA composition and a polymer (e.g., polyethylene) into an extruder (optionally with other additives); (b) coextruding the PPA composition and polymer in the extruder at an elevated temperature suitable for melting both the PPA and the polymer (e.g., 200° C. or higher); and (c) pelletizing the extrudate to form the polymer composition comprising the PPA blend. Preferably, the extrusion is carried out under oxygen-poor atmosphere (e.g., nitrogen atmosphere).

Other Additives

As noted, other additives optionally can also be present in the polymer composition (e.g., antioxidants, stabilizers such as UV stabilizers, catalyst neutralizers, and other additives known in the art of polymerization). Where such additives are employed, they are also preferably free or substantially free of fluorine. Further, it is reiterated that where other additives are present, the mass of such additives is included in the denominator for determining the ppm loading amounts for PPA blends described herein (that is, the ppm loading is on the basis of total mass of polymer+PPA blend+other additives).

According to various embodiments, it may be advantageous to employ an additive package including antiblock and/or slip agents. Examples of antiblock agents are well known in the art, and include talc, crystalline and amorphous silica, nepheline syenite, diatomaceous earth, clay, or various other anti-block minerals. Particular examples include the Optibloc agents available from Mineral Technologies. Examples of slip agents for polyolefins include amides such as erucamide and other primary fatty amides like oleamide; and further include certain types of secondary (bis) fatty amides. Antiblock agent loading is often around 500 to 6000 ppm, such as 1000 to 5000 ppm; slip agent loading is typically 200 to 1000, 2000, or 3000 ppm. Other can include, for example: fillers; antioxidants (e.g., hindered phenolics such as IRGANOX™ additives available from Ciba-Geigy); phosphites (e.g., IRGAFOS™ compounds available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; release agents; anti-static agents; pigments; colorants; dyes; waxes; silica; fillers; talc; mixtures thereof, and the like.

Films

As noted, a significant reason for employing PPAs is to eliminate melt fracture in blown films. Ideally, when replacing incumbent PPAs with the PPA blends of the present disclosure, films made from polymer compositions including such PPA blends will exhibit similar or superior properties as compared to films made using polymer compositions comprising conventional PPA.

Thus, the invention of the present disclosure can also be embodied in a film made from any of the above-described polymer compositions (and in particular, polyethylene compositions) comprising the polymer and PPA blend, and preferably being substantially free of fluorine; wherein the film has one or more of (and preferably all of):

- 1% secant modulus (MD) within +/−5% psi, preferably within +/−1% psi, of the value (psi) of a film that is made using a fluoropolymer-based PPA instead of the PPA blend, but is otherwise identical;
- Elmendorf tear (MD) within +/−10% g, preferably within +/−5% g, of the value (g) of a film that is made using a fluoropolymer-based PPA instead of the PPA blend, but is otherwise identical;
- Total haze within +/−25%, preferably within +/−10%, of the value (in %) of a film that is made using a fluoropolymer-based PPA instead of the PPA blend, but is otherwise identical, and/or total haze less than 6%;
- Gloss (MD) within +/−12%, preferably within +/−10%, of the value (in GU) of a film that is made using a fluoropolymer-based PPA instead of the PPA blend, but is otherwise identical; and
- Dart within +/−1%, preferably within +/−0.5% or even within +/−0.1%, of the value (g) of a film that is made using a fluoropolymer-based PPA instead of the PPA blend, but is otherwise identical.

In the discussion above, a film "made using a fluoropolymer-based PPA instead of the PPA blend, but is otherwise identical" is intended to mean that a film made using an effective amount of PPA blend is compared against a film made using an effective amount of fluoropolymer-based PPA; not necessarily that the same amount of each PPA is used. An effective amount is such that visible melt fractures are eliminated from the film, consistent with the discussion in connection with Example 1.

EXAMPLES

To facilitate a better understanding of the embodiments of the present invention, the following examples of preferred or representative embodiments are given.

Example 1

A sole PPA formulation (employing 1200 ppm of Pluriol® E 8000, a PEG 8K) was used with an ethylene-hexene-copolymer mLLDPE having 0.50 MI, 30 MIR, and 0.916 g/cc density. This polymer composition was made into a blown film using an extruder line L2, operated using a mono film annular die with the following conditions: a blowup ratio of 2.5, a die temperature set point of 390° F., a film gauge of 3 mil, a die gap of 30 mil, and a frost line height of approx. 5 times the die diameter (which, for L2 is 51 mm). Initially for preparing for the trials on line L2, the L2 film line extruder was fed with a blend of a preceding polyethylene with Polybatch® KC 30 (a polyethylene-based cleaning and purging compound from A. Schulman, Inc.) in a 2:1 weight ratio (of preceding PE to KC 30 cleaning compound) for at least 30 minutes; further, the preceding polyethylene was a PPA-free version of the same polyethylene tested with the PEG 8K (noted above). This helped ensure the extruder was free of any contaminants or remaining PPA from previous extrusions, so as to minimize the presence of components that could affect the testing.

Melt fraction elimination was observed in the extruded film, with FIG. 1 schematically illustrating the phenomenon of melt fracture, and by extension illustrating how its elimination is judged. Specifically, with reference to FIG. 1, as the PPA is added, melt fracture-free regimes begin to emerge as stripes 101 in the machine direction 110 of the film 100 (that is, the direction in which the film is extruded and blown). FIG. 1 is a schematic conceptually illustrating this transitory period with streaks 105 of melt-fractured film material, and the stripes 101 of melt fracture-free film. Over time, these stripes 101 grow in width and the melt fracture zones diminish, and are eventually eliminated completely when the PPA is performing as intended.

Figure 2A:
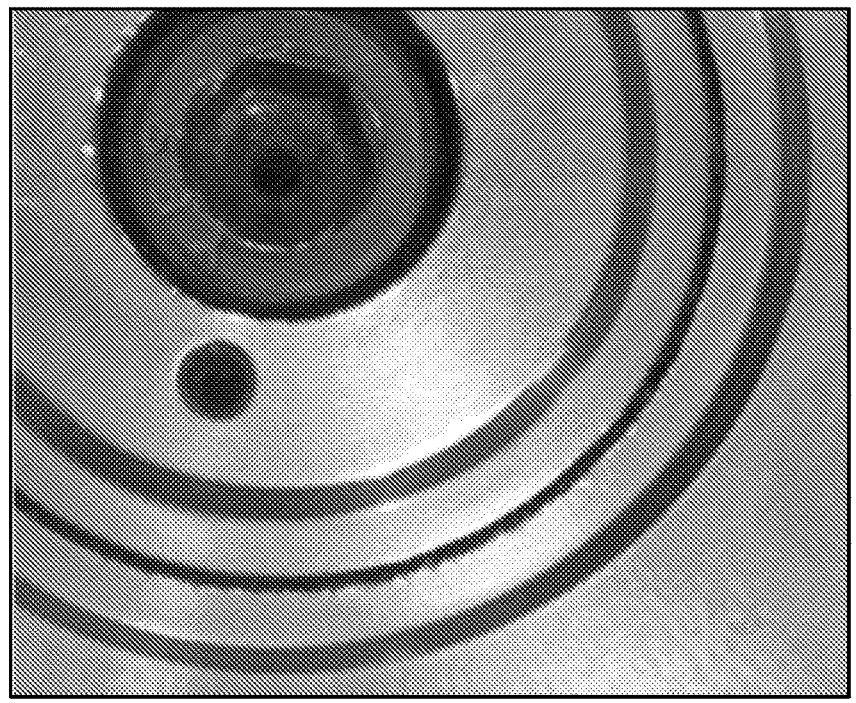
FIG. 2A is a photograph showing an annular blown film die exit at the beginning of a blown film extrusion process.
Figure 2B:
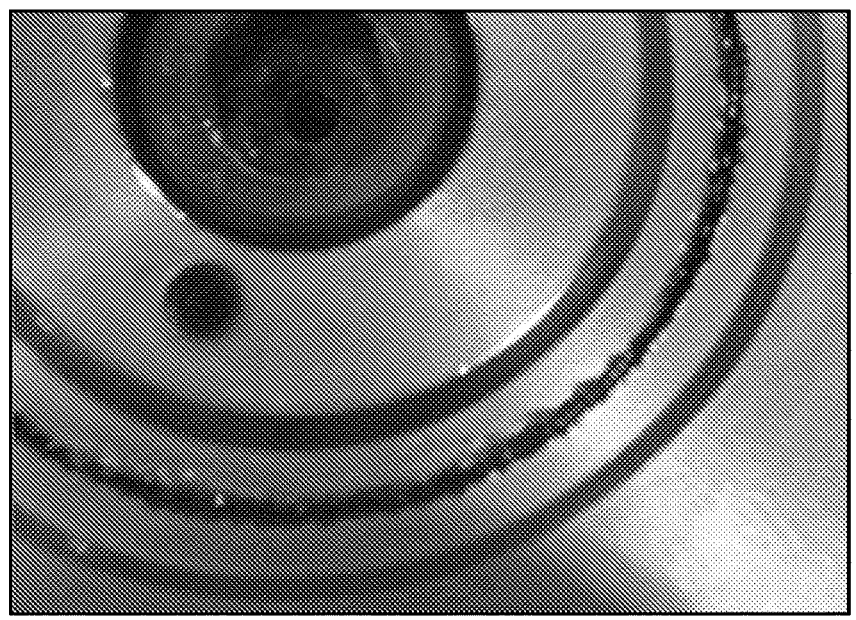
FIG. 2B is a photograph showing the annular blown film die exit depicted in FIG. 2A, except after 12 hours of processing blown film therethrough.

FIGS. 2A and 2B are photographs illustrating the die lip build-up resulting from employing this single PPA solution, rather than a blend. Specifically, FIG. 2A illustrates a clean die; while FIG. 2B shows die buildup after only 12 hours of film extrusion of the ethylene-hexene copolymer therethrough. It is preferable for die lip buildup to take several days to substantially occur, e.g., 3-8 days; with longer being better due to the downtime required for cleaning excessive buildup before operations can continue.

Example 2

Loading of metal salts of fatty acids in the blend was also tested using the same method and same mLLDPE as in Example 1 (that is, a PPA-free version of the mLLDPE was fed through the extruder L2, and then the mLLDPE-with-PPA-blend was fed through the extruder to make blown film). This was repeated twice: (1) with a PPA blend of 1000 ppm Avapol 60K (polysorbate 60) and 500 ppm zinc stearate; and (2) with a PPA blend of 500 ppm Avapol 60K and 500 ppm zinc stearate. It was observed that melt fracture elimination was notably less successful when zinc stearate was included at lesser amounts, or melt fracture simply was not eliminated. Specifically, the composition of 1000 ppm Avapol 60K/500 ppm zinc stearate failed to eliminate melt fracture in the blown film, while the composition of 500 ppm/500 ppm (polysorbate 60/zinc stearate) was successful, showing that even lower loading could achieve good results when observing this preferred component ratio. This may be due to Avapol's low viscosity as a small molecule. This observation indicates that more PPA is not always better, and that a non-obvious optimal range or ratio of composition will work best. Importantly, melt fracture elimination was also observed; and, furthermore, die buildup was observed to be less after 12 hours, as compared to the PPA consisting of PEG alone.

Example 3

Optimal ratios of compositions for PPA blends were further investigated on Extruder L2 with the extrusion and die conditions indicated in Table 1 below.

TABLE 1

L2 Extruder and Die Processing Conditions

| | | | |
|---|---|---|---|
| Die diameter (in.): | 2 | Forming cone (turns out): | 1 |
| Die gap (mil): | 30 | Zone 1 temp. (F.): | 310 |
| Mass air ring height (in): | 0.250 | Zone 2 temp. (F.): | 410 |
| Chimney height (in): | 0.875 | Zone 3 temp. (F.): | 380 |
| Gauge (mil): | 2-5 mil | Zone 4 temp. (F.): | 350 |
| BUR: | 2.5 | Screen changer temp. (F.): | 360 |
| Frostline height (in): | 10 | Adapter temp. (F.): | 360 |
| Die factor (lbs/hr-in): | — | Block zone temp. (F.): | 360 |
| True Output (lbs/hr): | 25 | Die zones 1 & 2 temp. (F.): | 390 |
| Line Speed (ft/min): | — | Target melt temp. (F.): | 390 |

Multiple films were made using two different polyethylene resins, each resin being used with different PPA blends with different component ratios. Materials used were as follows:

- Exceed 1018 ethylene-hexene copolymer (polyethylene) from ExxonMobil Chemical Company, having density of 0.92 g/cm$^3$, MI 0.90 g/10 min (190° C., 2.16 kg loading), HLMI of 14.611 g/10 min (190° C., 21.6 kg loading), and MIR (HLMI/MI) of 16.216; with additives of 500 ppm of Irganox® 1076 (phenolic primary antioxidant, available from BASF) and 1000 ppm of Irgafos® 168 (phosphite processing stabilizer (secondary antioxidant) from BASF), both ppm measurements on the basis of total mass of polymer composition;
- Exceed XP 8656 ethylene-hexene copolymer (polyethylene) from ExxonMobil Chemical Company, having density of 0.915 g/cm$^3$, MI of 0.478 g/10 min (190° C., 2.16 kg loading), HLMI of 14.0 g/10 min (190° C., 21.6 kg loading), and MIR (HLMI/MI) of 29.190; with additives of 600 ppm of Irganox® 1076 and 1200 ppm of Irgafos® 168;
- Pluriol E 8000, a PEG having Mw of about 8000 (referred to as "PEG" in Tables 2-6 in connection with this Example 3);
- Avapol 60K or Avapol 60, the polysorbate referenced in connection with Example 2 (referred to as "Avpl" in Tables 2-6 in connection with this Example 3);
- ZnSt, a zinc stearate composition (referred to as "ZnSt" in Tables 2-6 in connection with this Example 3).

The general process used for film production in each trial for Example 3 was as follows:

- Run extruder with a 2:1 blend of purge resin: Polybatch® KC 30. Continue until clean, about 30 min. The Purge resin used in this preliminary cleaning step for each trial is a PPA-free version of the same polyethylene used for film production for the given trial.
- Manually clean and polish inner die with polishing paste (Improved Old Purpose Mold Polish by IMS Company).
- Run purge resin until KC30 is gone and melt fracture is steady, about 45 min. Typical purge resin rates were 2-3 lbs/hr to obtain steady melt-fracture free film product.
- Set test timer to 0. Feed test resin (resin plus PPA Blend being tested) at target output rate. Adjust rpm to get target output within the first 15 min.
- Every 15 min: take 2 ft. film sample and label w/test resin, date & collection time, record run data on table.
- Run until whichever comes first: melt fracture is eliminated or 105 minutes.

The results from the Example 3 trials are summarized below in Tables 2-1, 2-2, 3-1, 3-2, and 4, which report the following for each trial run: the amounts and ratios of components in each PPA blend; total PPA used; melt fracture observed at 105 min (MF @ 105 min) as a % of film area containing visible melt fractures; time to melt fracture elimination (MFE) in min; initial pressure at the extrusion die (psi); operating pressure (psi). Initial pressure and operating pressure provide an additional performance metric to track, insofar as a greater drop from initial to operating pressure is better (indicating greater ease of processing). In this experiment, operating pressure is taken as the final pressure at the end of the test (end time if melt fracture persisted, or the time at which complete melt fracture elimination was observed). Furthermore, output rates of all trial films normalized for annular die circumference (lbs/hr.-in. die) were maintained within +/−30% of each other.

In addition, each Table below includes, for ease of reference, a comparison against films made using a conventional fluoropolymer-based PPA (Dynamar™ FX5929M): C-1, film made using Exceed 1018 with 400 ppm of the PPA, and C-2, film made using Exceed XP 8656 with 500 ppm of the PPA. Other than the PPA replacement, the same procedure was used for making each of these films as for making the films with fluoropolymer-free PPA blends.

Finally, results of the trials are discussed in more detail in connection with each table below, also with reference to accompanying figures illustrating reduction in melt fracture over time. See FIG. 1, discussed above, regarding the observation of melt fracture and its elimination in the extruded film over time. Further to that discussion, the percentage of melt fracture at a given time can be taken as the percentage of film area exhibiting melt fracture regions (e.g., streaks 105 as illustrated in FIG. 1) as determined by visual observation, and in this manner, a plot of extent of melt fracture (%) over time can be built for each trial sample. Each Figure accompanying the below tables is such a plot of melt fracture elimination in each of that table's trial samples. Finally, melt fracture observation data was collected once every 15 minutes, and when elimination was observed to occur between two data collection points, the approximate time is taken between the points by adding 7 minutes to the prior observed time. Thus, if melt fracture is eliminated between the 15-minute observation and the 30-minute observation, elimination is reported at 22 minutes.

TABLE 2-1

Exceed 1018 with PEG/Avpl PPA Blends

| ID | PEG/Avpl (ppm/ppm) | Ratio PEG/Avpl | Total PPA (ppm) | MF@105 min (%) | Time to MFE (min) | Initial Pressure (psi) | Pressure (psi) |
|---|---|---|---|---|---|---|---|
| C-1 | n/a (400 ppm Dynamar) | n/a | 400 | 0 | ~102* | 5400 | 4080 |
| I-1 | 400/400 | 1 | 800 | 0 | 52 | 5760 | 4360 |

TABLE 2-1-continued

Exceed 1018 with PEG/Avpl PPA Blends

| ID | PEG/Avpl (ppm/ppm) | Ratio PEG/Avpl | Total PPA (ppm) | MF@105 min (%) | Time to MFE (min) | Initial Pressure (psi) | Pressure (psi) |
|---|---|---|---|---|---|---|---|
| I-2 | 800/800 | 1 | 1600 | 0 | 52 | 5760 | 4010 |
| I-3 | 800/400 | 2 | 1200 | 0 | 82 | 5760 | 4320 |
| I-4 | 400/800 | 0.5 | 1200 | 0.1 | N/A | 5450 | 3735 |
| I-5 | 800/200 | 4 | 1000 | 0 | 82 | 5660 | 3830 |
| I-6 | 650/325 | 2 | 975 | 0 | 37 | 5760 | 4270 |
| I-7 | 430/220 | 1.95 | 650 | 0.2 | N/A | 5660 | 4460 |

*C-1 melt fracture almost, but not entirely, observed to be eliminated by 100 min. Final melt fracture eliminated between 100 and 105 min, hence elimination is reported as 102 min, the mid-point rounded down for consistency with other reported MFE times.

Figure 3:
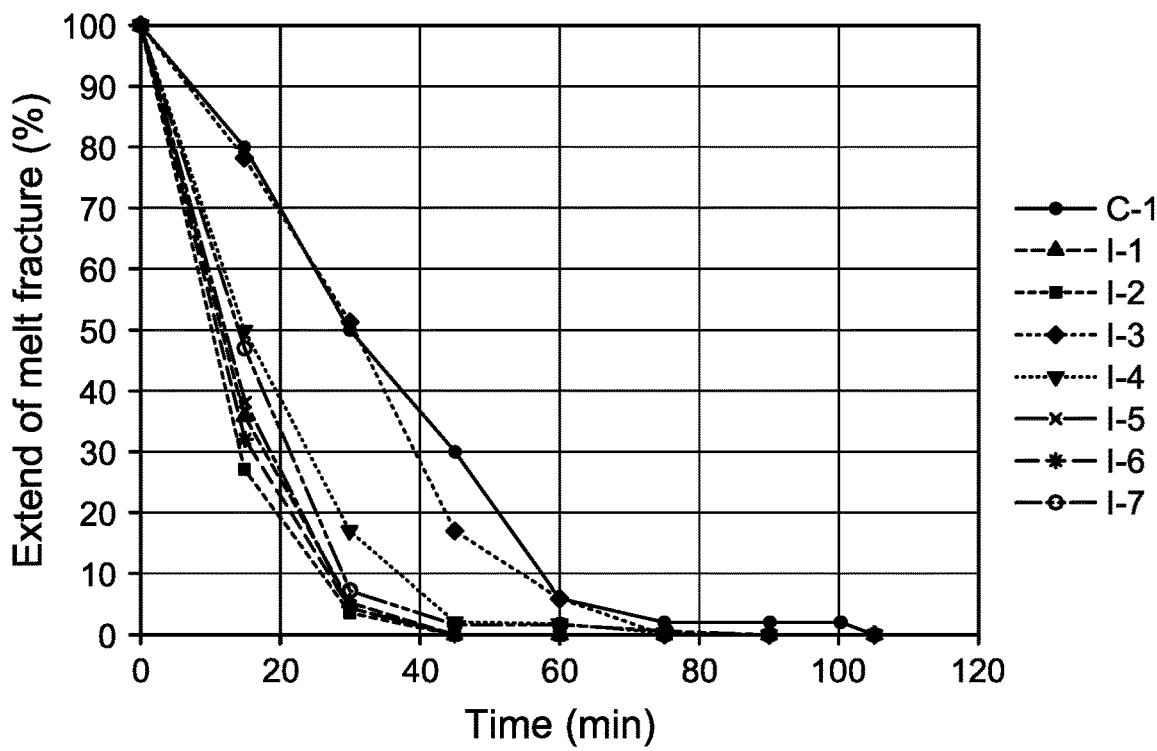
FIG. 3 is a graph showing melt fracture elimination vs. time in various trial extrusions of polymer film in connection with the examples.

Accompanying FIG. 3 illustrates the melt fracture elimination in each of the samples summarized in Table 2-1. While Table 2-1 indicates all but two PPA blends outperformed the conventional fluoropolymer-based PPA, FIG. 3, showing a more complete timeline of melt fracture elimination, illustrates that the superior performance of the blends is obtained through a substantially quicker elimination of most melt fractures, with the final minority portion of melt fracture eliminated more slowly over the final minutes of the trial run. Moreover, even in the blends where melt fracture was not entirely eliminated (I-4 and I-7), only 0.1 or 0.2% of film surface exhibited melt fracture after 100 minutes; and FIG. 3 shows this to be a highly similar trend to melt fracture elimination using the conventional PPA. The data indicates that a PEG/polysorbate combination (such as the PEG/Avapol) is a particularly robust PPA blend, with good results obtained across multiple ratios of the individual blend components.

TABLE 2-2

Exceed XP 8656 with PEG/Avpl PPA Blends

| ID | PEG/Avpl (ppm/ppm) | Ratio PEG/Avpl | Total PPA (ppm) | MF@105 min (%) | Time to MFE (min) | Initial Pressure (psi) | Pressure (psi) |
|---|---|---|---|---|---|---|---|
| C-2 | n/a (500 ppm dynamar) | n/a | 500 | 0 | 52 | 5650 | 4025 |
| I-8 | 400/400 | 1 | 800 | 0.01 | N/A | 4710 | 4525 |
| I-9 | 800/800 | 1 | 1600 | 0 | 82 | 4865 | 3770 |
| I-10 | 800/400 | 2 | 1200 | 0.01 | N/A | 4845 | 3960 |
| I-11 | 400/800 | 0.5 | 1200 | 0 | 82 | 4840 | 4060 |
| I-12 | 800/200 | 4 | 1000 | 0 | 52 | 4830 | 4370 |
| I-13 | 650/325 | 2 | 975 | 0 | 67 | 4780 | 4180 |
| I-14 | 430/220 | 1.95 | 650 | 0.01 | N/A | 4840 | 4395 |

Figure 4:
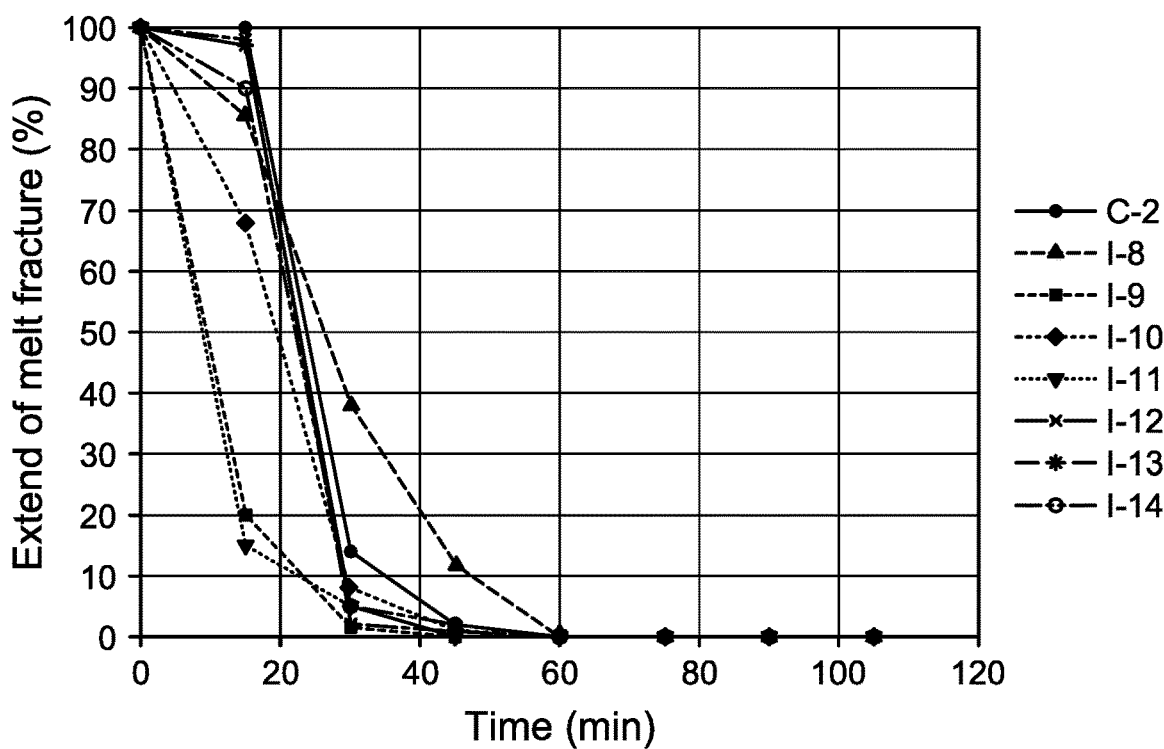
FIG. 4 is a graph showing melt fracture elimination vs. time in various trial extrusions of polymer film in connection with the examples.

Accompanying FIG. 4 illustrates the melt fracture elimination in each of the samples summarized in Table 2-2. FIG. 4 illustrates that although total time to melt fracture elimination using the PPA blends was often higher than for the conventional PPA (with I-12 being the exception), it can be seen that in many cases (all but I-8), the PPA blend still resulted in generally faster melt fracture elimination for 90-95% of all melt fractures, with elimination of the final 5% taking additional time. However, in general, FIG. 4 and Table 2-2 indicate that total amount of the PEG/polysorbate blend (e.g., the blend being present at 1000 ppm or greater), rather than a particular ratio of components in the blend, may have a stronger correlation to successful melt fracture elimination in the Exceed XP 8656 polymer.

Further, Comparing FIG. 4 to FIG. 3 (and Table 2-2 to Table 2-1), it can be seen that the identity of the resin can have some impacts on PPA performance.

TABLE 3-1

Exceed 1018 with ZnSt/PEG PPA Blends

| ID | ZnSt/PEG (ppm/ppm) | Ratio ZnSt/PEG | Total PPA (ppm) | MF@105 min (%) | Time to MFE (min) | Initial Pressure (psi) | Pressure (psi) |
|---|---|---|---|---|---|---|---|
| C-1 | n/a (400 ppm | n/a | 400 | 0 | 102 | 5400 | 4080 |

TABLE 3-1-continued

Exceed 1018 with ZnSt/PEG PPA Blends

| ID | ZnSt/PEG (ppm/ppm) | Ratio ZnSt/PEG | Total PPA (ppm) | MF@105 min (%) | Time to MFE (min) | Initial Pressure (psi) | Pressure (psi) |
|---|---|---|---|---|---|---|---|
| | Dynamar) | | | | | | |
| I-15 | 400/400 | 1 | 800 | 15 | N/A | 5290 | 5325 |
| I-16 | 800/800 | 1 | 1600 | 0 | 52 | 5710 | 5070 |
| I-17 | 800/400 | 2 | 1200 | 0 | 37 | 5745 | 5175 |
| I-18 | 400/800 | 0.5 | 1200 | 0.04 | N/A | 5650 | 4560 |
| I-19 | 800/200 | 4 | 1000 | 8.5 | N/A | 5675 | 5175 |
| I-20 | 650/325 | 2 | 975 | 10 | N/A | 5725 | 5260 |
| I-21 | 430/220 | 1.95 | 650 | 50 | N/A | 5725 | 5230 |

TABLE 3-2

Exceed XP 8656 with ZnSt/PEG PPA Blends

| ID | ZnSt/PEG (ppm/ppm) | Ratio ZnSt/PEG | Total PPA (ppm) | MF@105 min (%) | Time to MFE (min) | Initial Pressure (psi) | Pressure (psi) |
|---|---|---|---|---|---|---|---|
| C-2 | n/a (500 ppm dynamar) | n/a | 500 | 0 | 52 | 5650 | 4025 |
| I-22 | 400/400 | 1 | 800 | 8 | N/A | 4765 | 4850 |
| I-23 | 800/800 | 1 | 1600 | 0.07 | N/A | 4630 | 4765 |
| I-24 | 800/400 | 2 | 1200 | 9.5 | N/A | 4630 | 4860 |
| I-25 | 400/800 | 0.5 | 1200 | 0.1 | N/A | 4660 | 4810 |
| I-26 | 800/200 | 4 | 1000 | 95 | N/A | 4810 | 5060 |
| I-27 | 650/325 | 2 | 975 | 30 | N/A | 4850 | 4895 |
| I-28 | 430/220 | 1.95 | 650 | 40 | N/A | 4835 | 4955 |

Figure 5:
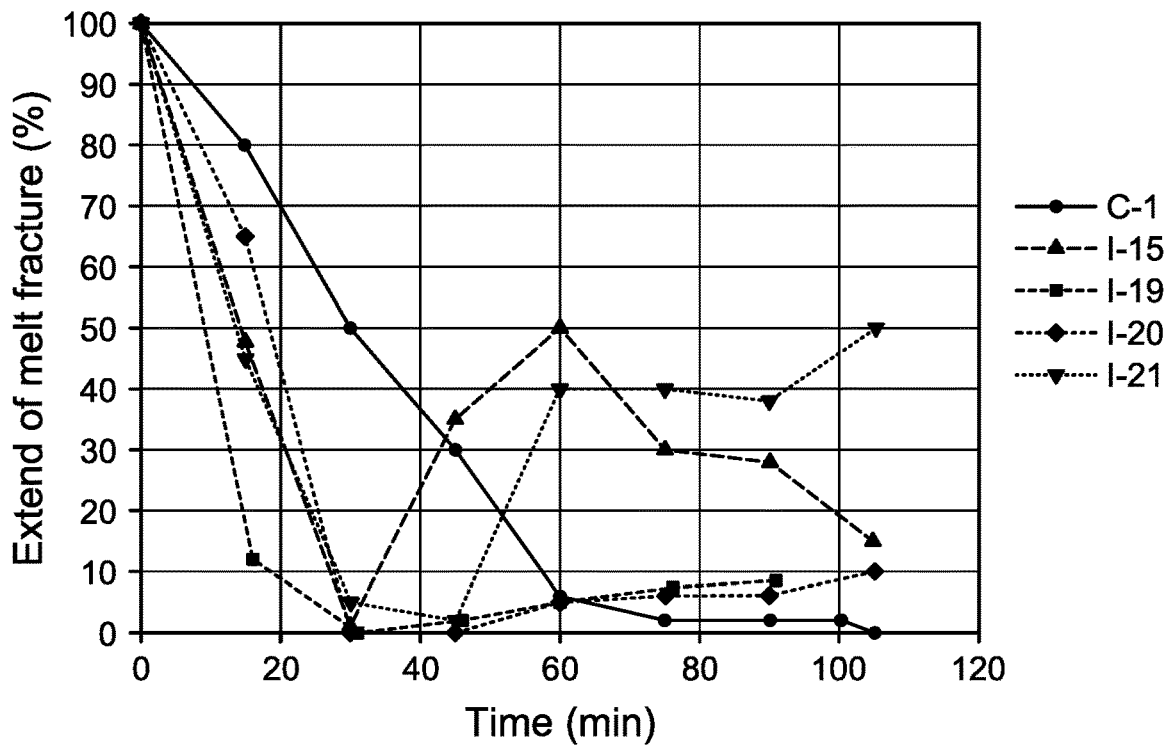
FIG. 5 is a graph showing melt fracture elimination vs. time in various trial extrusions of polymer film in connection with the examples.
Figure 6:
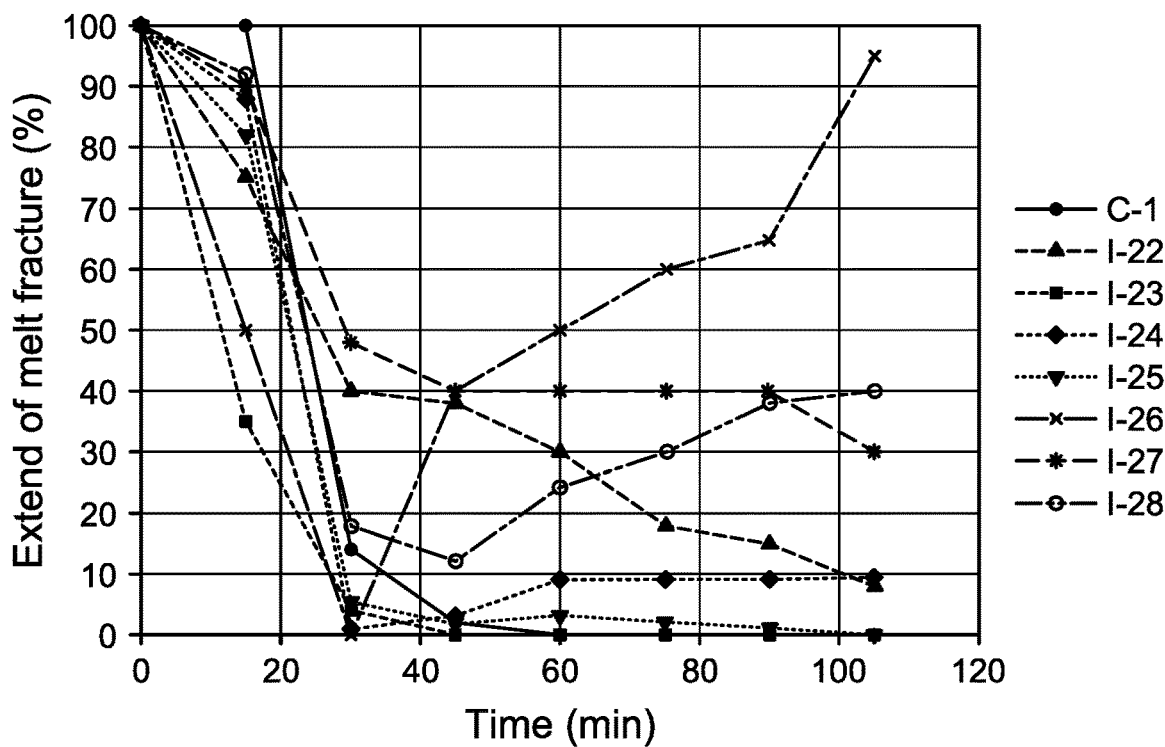
FIG. 6 is a graph showing melt fracture elimination vs. time in various trial extrusions of polymer film in connection with the examples.

Accompanying FIGS. 5 and 6 illustrate the melt fracture elimination in each of the samples summarized in Tables 3-1 and 3-2. Both the figures and tables illustrate that melt fracture elimination was elusive for many of the ZnSt/PEG blends tested, indicating that a high degree of loading is a minimum requirement for melt fracture elimination (e.g., 1200 ppm or more, preferably 1600 ppm or more), noting, however, that for the XP 8656 resin, even these higher loadings did not entirely eliminate melt fractures (per I-23, I-24, and I-25). In fact, many of these PPA blends exhibited quick melt fracture elimination, followed by an actual increase and plateau effect (see FIGS. 5, 6).

TABLE 4

Exceed 1018 with ZnSt/Avpl PPA Blends

| ID | ZnSt/Avpl (ppm/ppm) | Ratio ZnSt/Avpl | Total PPA (ppm) | MF@105 min (%) | Time to MFE (min) | Initial Pressure (psi) | Pressure (psi) |
|---|---|---|---|---|---|---|---|
| C-1 | n/a (400 ppm Dynamar) | n/a | 400 | 0 | 102 | 5400 | 4080 |
| I-29 | 400/400 | 1 | 800 | 0 | 22 | 5750 | 5135 |
| I-30 | 800/800 | 1 | 1600 | 0 | 22 | 5735 | 5230 |
| I-31 | 800/400 | 2 | 1200 | 0 | 22 | 5655 | 5015 |
| I-32 | 400/800 | 0.5 | 1200 | 0.07 | N/A | 5640 | 5025 |
| I-33 | 800/200 | 4 | 1000 | 0 | 22 | 5555 | 4945 |
| I-34 | 650/325 | 2 | 975 | 30.2 | N/A | 5640 | 5180 |
| I-35 | 430/220 | 1.95 | 650 | 12 | N/A | 5670 | 5050 |

Figure 7:
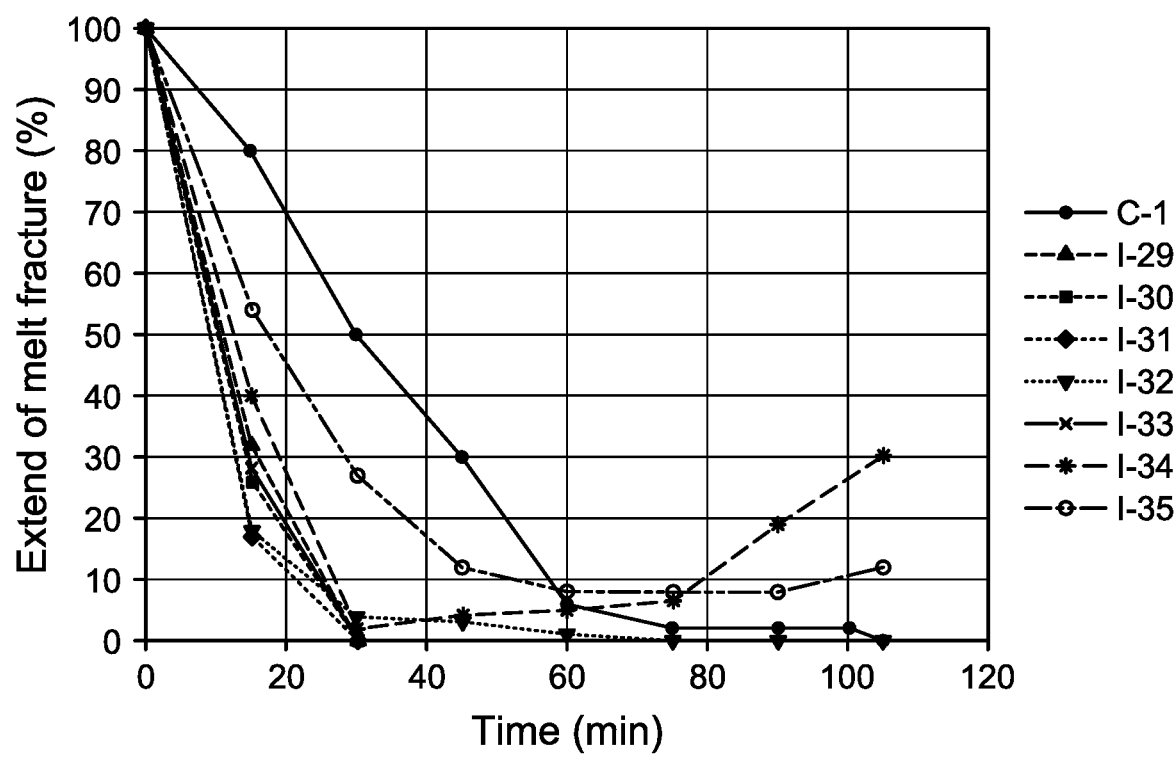
FIG. 7 is a graph showing melt fracture elimination vs. time in various trial extrusions of polymer film in connection with the examples.

Accompanying FIG. 7 illustrates the melt fracture elimination in each of the samples summarized in Table 4. The ZnSt/Polysorbate blends tested in many of these trials showed rapid melt fracture elimination, superior to the control, provided that ZnSt was present with polysorbate in a ratio between 1:1 and 2:1 (ZnSt:Polysorbate), and adequate amounts of PPA blend were present (e.g., 1000 ppm or more, noting an exception for the 1:1 ratio with 800 ppm total PPA blend per I-29).

Figure 8:
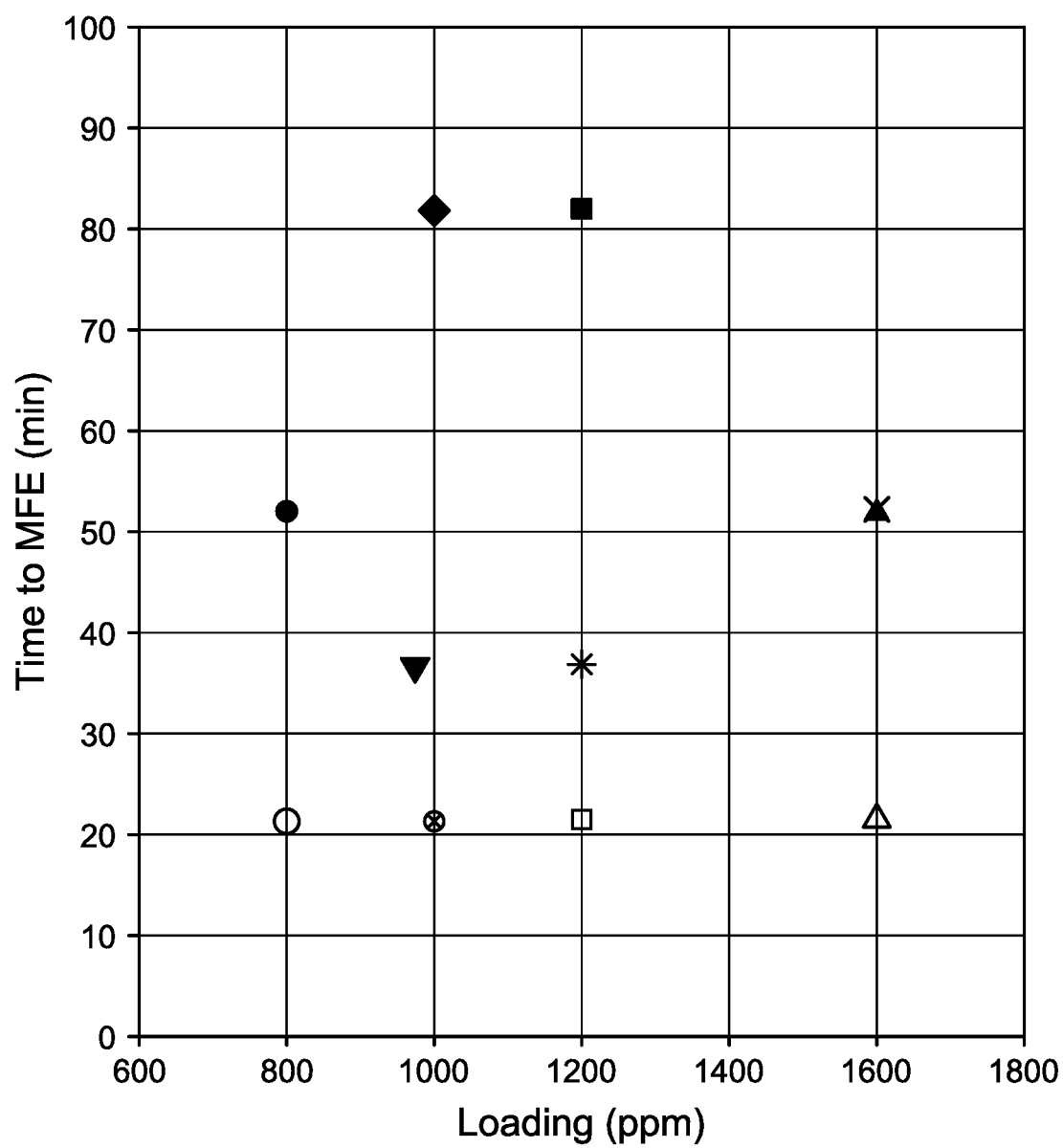
FIG. 8 is a graph compiling time to melt fracture elimination vs. PPA loading in polymer compositions extruded into polymer films in connection with the examples.

The overall results of the experiments further yielded some important common threads: all three blends failed to achieve complete melt fracture elimination when employed at <800 ppm, and/or with ratio (first blend component to second blend component, where ZnSt, when present, is always a first blend component, and polysorbate, when present, is always a second blend component) of 0.5 or less. The ratio result is particularly interesting, since poor performance remained even where overall PPA blend loading was high (1200 ppm). Finally, the overall results indicate the polysorbate-containing blends in general offer superior performance as compared to ZnSt/PEG blends. Thus, a consistent quality of top-performing blends in the trial runs is the presence of 50 wt % or less of polysorbate (said wt % based on total mass of the blend), with a secondary quality being the amount of PPA blend employed: at least 800 ppm, preferably at least 1000 ppm, such as 800 or 1000 ppm to 1800 or 2000 ppm (said ppm on basis of total mass of polymer composition being extruded into film). That said, ZnSt/PEG blends can still achieve acceptable results at the appropriate (higher) loading (e.g., 1200 ppm or more, such as 1200-1800 ppm). See FIG. 8 for a chart illustrating successful melt fracture elimination times vs. PPA blend loading for the various successful blends of the trial runs.

Figure 9:
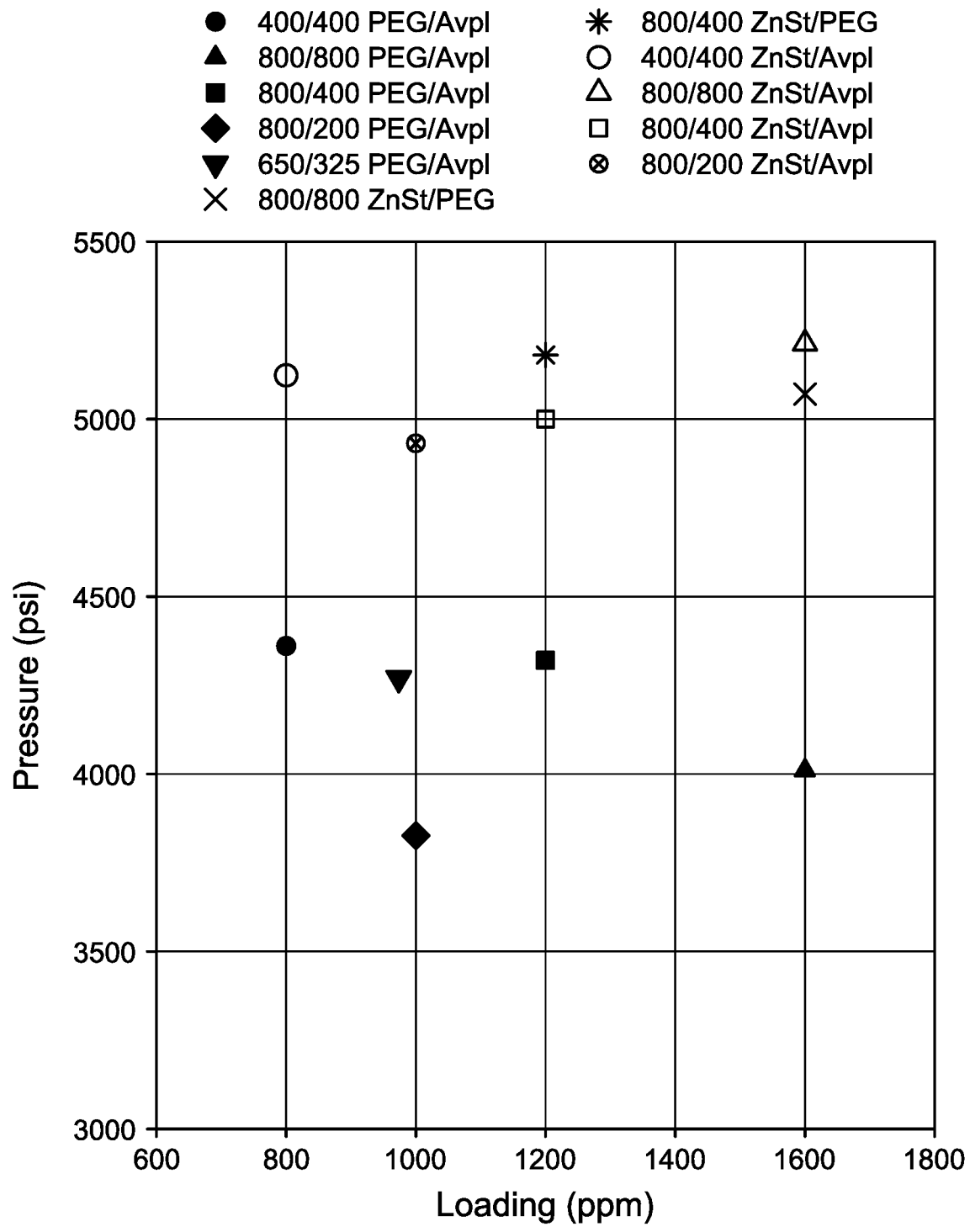
FIG. 9 is a graph compiling time to melt fracture elimination vs. PPA loading in polymer compositions extruded into polymer films in connection with the examples.
Figure 10A:
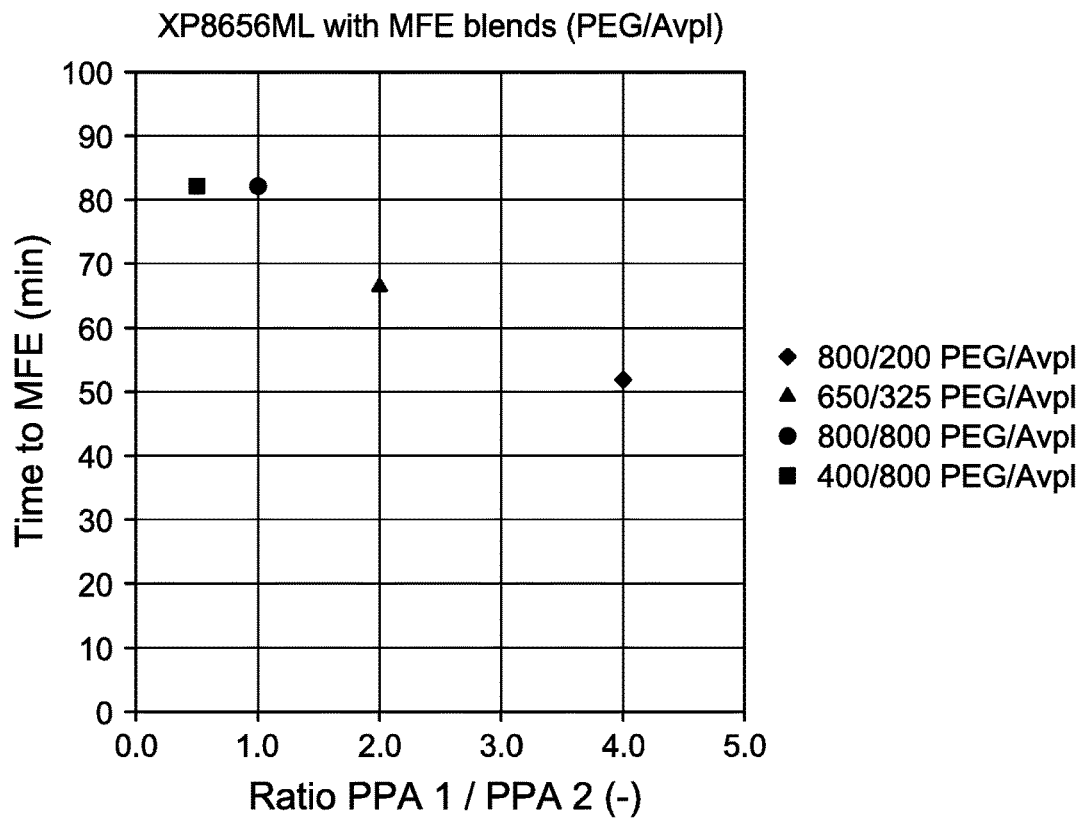
FIG. 10A is a graph showing time to melt fracture elimination vs. blend component ratios in connection with some of the examples.
Figure 10B:
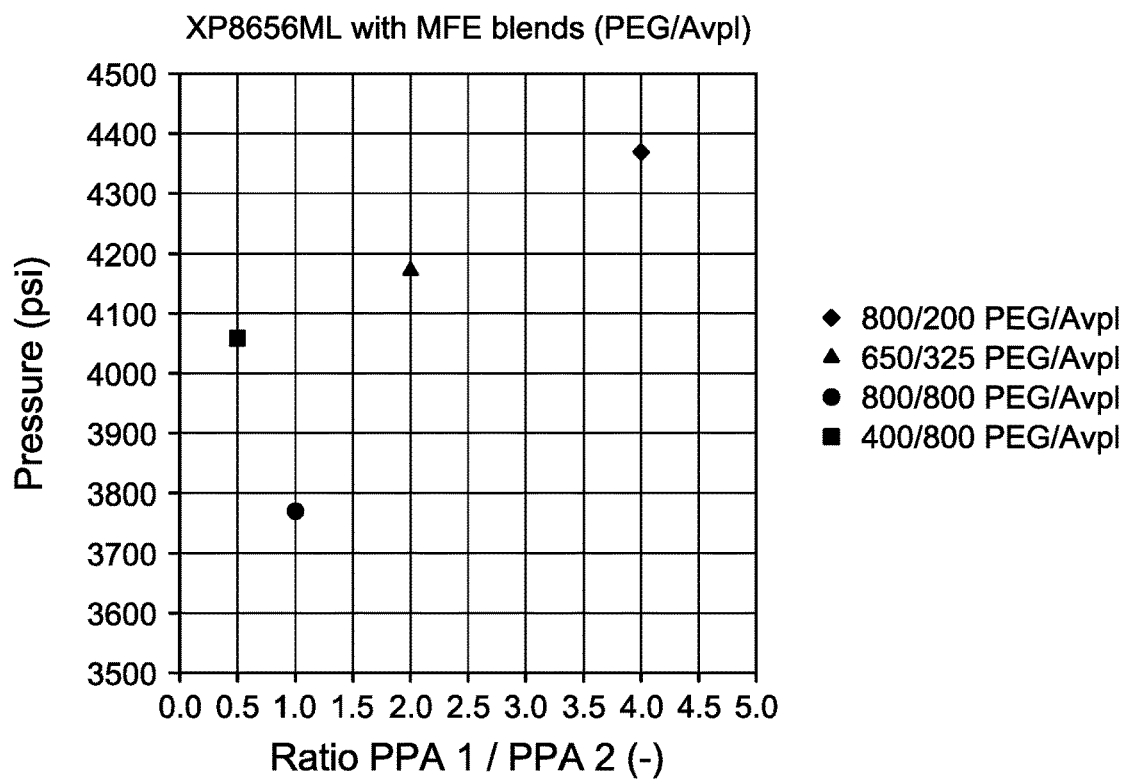
FIG. 10B is a graph showing extruder pressure vs. blend component ratios in connection with some of the examples.

Furthermore, FIG. 9 illustrates pressure profiles for the extrusion trials of Exceed 1018 with the PPA blends, noting that lower pressures indicate better processing performance. Per FIG. 9, the PEG/Polysorbate blends achieved the lowest (best) pressure profiles for the Exceed 1018 films, while the other two blends were similar in their pressure profiles. The data for films formed from the Exceed XP 8586 resin provide further insight into optimal ratios of PEG/Polysorbate, revealing a potential trade-off between faster melt fracture elimination, on the one hand, and pressure reduction on the other hand. In particular, per FIGS. 10A and 10B, increasing ratio of PEG:Polysorbate leads to faster melt fraction elimination, but also higher processing pressures.

Thus, in general, PEG/Polystearate blends, while not necessarily always the fastest at eliminating melt fracture, offer a particular advantage of consistency across many different ratios of blend components and lowest extruder pressures during processing.

TABLE 5

Measurement methods.

| Test Name or Parameter Name | Method or description |
| --- | --- |
| Melt index (MI), high load melt index (HLMI) | ASTM D-1238 2.16 kg (melt index) or 21.6 kg (high load melt index), 190° C. |
| Melt index ratio | High load melt index/melt index |
| Density | ASTM D1505, column density. Samples were molded under ASTM D4703-10a, Procedure C, then conditioned under ASTM D618-08 (23° ± 2° C. and 50 ± 10% relative humidity) for 40 hours before testing |
| Percent melt fracture coverage | Measured by eye. The fraction of melt fracture Estimated visually from a 2-ft long sample of film, taken as a percentage of the area with noticeable, characteristic melt fracture roughness. Clear delineation existed between the melt fractured regions and the smooth, melt fracture free regions of the sample. |
| Pressure | Read off the in-line calibrated pressure transducer of the blown film line extruder, before the screen-pack, and recorded. |
| PEG composition by NMR | 1 H NMR experiments were run on a 700 MHz Broker Avance™ IIIHD equipped with a 10 mm high temperature dual channel cryoprobe. Samples were prepped at 140° C. with around 90 mg of sample per 3 ml of 1,1,2,2-tetrachloroethane-d2. Samples were measured using a 30° pulse or less, with 512 transients, a 15 second delay and a temperature of 120° C. The 15 second delay was determined to be needed for accurate quantitative 1 H NMR, The inversion recovery pulse sequence was used to measure T1 with a 20 second delay in between. The variable delay ranged from 1 millisecond to 5 seconds. Once the delay time was determined, samples with ranges of PEG from 0-1800 ppm were measured using the quantitative 1 H NMR conditions. Fits to determine T1 were performed using MestReNova 14.0.1. The signal area used for quantification was 3.8-3.5 ppm. |
| 1% Secant Modulus | ASTM D-882, 15 mm width strip |
| Yield Strength | ASTM D-882, 15 mm width strip |
| Tensile Strength | ASTM D-882, 15 mm width strip |
| Elongation at Break | ASTM D-882, 15 mm width strip |
| Elongation at Yield | ASTM D-882, 15 mm width strip |
| Dart Drop | ASTM D-1709, Phenolic, Method A |
| Haze | ASTM D-1003 |
| Gloss, 45° | ASTM D-2457 |
| Elmendorf Tear | ASTM D1922 with conditioning for 40 hours at 23° ± 2° C. and 50 ± 10% relative humidity |
| Puncture | Modified ASTM D5748: ASTM probe was used with two 0.25 mil HDPE slip sheets. Machine Model: United SFM-1. Testing speed: 10 in/min |
| Heat Seal | Method using 1 inch film strip of 1 mil gauge, sealed at various temperatures under 73 psi (0.5 N/mm$^2$) for 1 second. Following conditioning for 40 hours at 23° ± 2° C. and 50 ± 10% relative humidity, the sealed specimen were tested in T-joint peel mode at 20 inch/min pulling speed |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of" "consisting of" "selected from the group of consisting of," or "is" preceding the recitation of the composition, element, or elements and vice versa.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

While the present disclosure has been described with respect to a number of embodiments and examples, those skilled in the art, having the benefit of this disclosure, will appreciate that other embodiments can be devised which do not depart from the scope and spirit of the present disclosure.

We claim:

1. A polymer composition comprising:
an ethylene copolymer comprising units derived from ethylene and units derived from one or more $C_3$ to $C_{20}$ α-olefins; and
from 200 to 10000 ppm (on a basis of mass of the polymer composition) of a polymer processing aid, wherein the polymer processing aid comprises at least 99 wt % of a blend comprising from 100 to 9900 ppm of: (A) a surfactant comprising a polysorbate and (B) a polyethylene glycol, wherein the blend comprises the surfactant in an amount of 50 wt % or less, on a basis of total mass of the blend, and wherein a balance of the blend consists of the polyethylene glycol; and
wherein the surfactant is polysorbate having the structural formula (I):

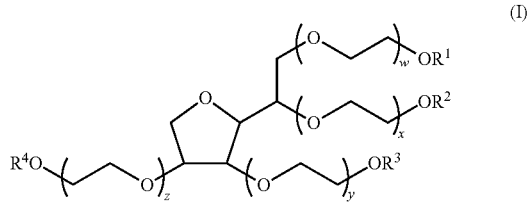

where one of $R^1$-$R^4$ is a straight chain fatty acid moiety, and the other three of $R^1$-$R^4$ are each hydrogen; and w, x, y, and z are integers such that $10 \leq w+x+y+z \leq 40$.

2. The polymer composition of claim 1, wherein the polymer processing aid consists essentially of the blend.

3. The polymer composition of claim 1, comprising from 400 to 3,000 ppm total of the polymer processing aid, and further wherein each component (A) and (B) of the blend, is individually present in the polymer composition in a range from 200 ppm to 1200 ppm (on a basis of mass of the polymer composition).

4. The polymer composition of claim 3, comprising from 800 to 2000 ppm total of the polymer processing aid.

5. The polymer composition of claim 1, wherein the surfactant is polysorbate 20, polysorbate 40, polysorbate 60, polysorbate 80, or combinations thereof.

6. The polymer composition of claim 1, wherein the blend comprises about 15 to 50 wt % surfactant and the balance polyethylene glycol, on the basis of total mass of the blend.

7. The polymer composition of claim 1, wherein the blend consists of the surfactant and polyethylene glycol, and further wherein the ratio of the amount of polyethylene glycol to amount of surfactant is within a range from 0.20 to 6.0.

8. The polymer composition of claim 1, wherein the polyethylene glycol in the polymer composition has weight average molecular weight less than 40,000 g/mol.

9. The polymer composition of claim 8, wherein the polyethylene glycol in the polymer composition has Mw within a range from 1,500 to 35,000 g/mol.

10. The polymer composition of claim 9, wherein the polyethylene glycol in the polymer composition has Mw within a range 5,000 to 12,000 g/mol.

11. The polymer composition of claim 1, wherein the ethylene copolymer is metallocene-catalyzed linear low density polyethylene (mLLDPE), comprising units derived from ethylene and units derived from 1-butene, 1-hexene, or 1-octene.

12. The polymer composition of claim 1, wherein the ethylene copolymer has density within a range from 0.905 to 0.945 g/cm³ and melt index (ASTM D1238 at 190° C., 2.16 kg loading) within a range from 0.1 to 5.0 g/10 min.

13. The polymer composition of claim 12, wherein the ethylene copolymer further has melt index ratio (MIR) within a range from 10 to 90.

14. The polymer composition of claim 1, wherein the polymer composition is formed by a process comprising melt-blending a blend of the polymer processing aid and the ethylene copolymer so as to obtain the polymer composition having homogenously distributed blend components among the ethylene copolymer.

15. The polymer composition of claim 14, wherein the melt-blending comprises coextruding the blend of the polymer processing aid and the ethylene copolymer in a compound extruder, optionally under oxygen-free atmosphere; obtaining an extrudate comprising the polymer processing aid and the ethylene copolymer; and pelletizing the extrudate to form the polymer composition comprising the polymer processing aid.

16. The polymer composition of claim 1, wherein the polymer composition is substantially free of fluorine.

17. A blown film made from the polymer composition of claim 1, wherein the film has one or more of:
i. 1% secant modulus (MD) within +/−5% of a value (psi) of a film that is made using a fluoropolymer-based PPA instead of the polymer processing aid comprising the blend, but is otherwise identical;
ii. Elmendorf tear (MD) within +/−10% of a value (g) of a film that is made using a fluoropolymer-based PPA instead of the polymer processing aid comprising the blend, but is otherwise identical;
iii. Total haze within +/−25% of a value (in %) of a film that is made using a fluoropolymer-based PPA instead of the polymer processing aid comprising the blend, but is otherwise identical, and/or total haze less than 6%;

iv. Gloss (MD) within +/−12% of a value (in GU) of a film that is made using a fluoropolymer-based PPA instead of the polymer processing aid comprising the blend, but is otherwise identical; and
v. Dart within +/−1%, of the value (g) of a film that is made using a fluoropolymer-based PPA instead of the polymer processing aid comprising the blend, but is otherwise identical.

\* \* \* \* \*